(12) United States Patent
Uehira et al.

(10) Patent No.: US 7,968,155 B2
(45) Date of Patent: Jun. 28, 2011

(54) OPTICALLY ANISOTROPIC MATERIAL, LIQUID CRYSTAL DISPLAY DEVICE AND TRIPHENYLENE COMPOUND

(75) Inventors: Shigeki Uehira, Minami-ashigara (JP); Michitaka Matsuumi, Minami-ashigara (JP); Michio Nagai, Minami-ashigara (JP); Atsuhiro Okawa, Ashigarakami-gun (JP)

(73) Assignee: Fujifilm Corporation, Mianto-Ku, Tokyo (JP)

( * ) Notice: Subject to any disclaimer, the term of this patent is extended or adjusted under 35 U.S.C. 154(b) by 1106 days.

(21) Appl. No.: 10/593,410

(22) PCT Filed: Mar. 17, 2005

(86) PCT No.: PCT/JP2005/005449
§ 371 (c)(1),
(2), (4) Date: Apr. 17, 2007

(87) PCT Pub. No.: WO2005/090519
PCT Pub. Date: Sep. 29, 2005

(65) Prior Publication Data
US 2007/0281111 A1 Dec. 6, 2007

(30) Foreign Application Priority Data

Mar. 19, 2004 (JP) .................. 2004-079389
Sep. 22, 2004 (JP) .................. 2004-274718

(51) Int. Cl.
C09K 19/32 (2006.01)
C09K 19/34 (2006.01)
C09K 19/40 (2006.01)
C09K 19/18 (2006.01)
C09K 19/30 (2006.01)
C07C 69/74 (2006.01)
C07C 69/75 (2006.01)

(52) U.S. Cl. ............... 428/1.1; 252/299.01; 560/124; 560/59; 560/8

(58) Field of Classification Search ............ 428/690, 428/1.1; 252/299.01; 560/124, 59, 8
See application file for complete search history.

(56) References Cited

U.S. PATENT DOCUMENTS

| 4,880,561 A * | 11/1989 | Tabohashi et al. ....... 252/299.61 |
| 5,310,745 A | 5/1994 | Partis et al. |
| 5,730,903 A | 3/1998 | Okazaki |
| 5,779,935 A * | 7/1998 | Takeichi et al. .......... 252/299.61 |
| 2003/0223026 A1 * | 12/2003 | Morishima et al. ........... 349/117 |

FOREIGN PATENT DOCUMENTS

| JP | 05-246943 A | 9/1993 |
| JP | 7-306317 A | 11/1995 |
| JP | 8-050206 A | 2/1996 |
| JP | 9-104866 A | 4/1997 |
| JP | 2001-166147 A | 6/2001 |
| JP | 2003-113141 A | 4/2003 |
| JP | 2004-010763 A | 1/2004 |

OTHER PUBLICATIONS

International Search Report dated May 19, 2005.
Written Opinion of the International Searching Authority.
Donald R. Stewart et al. "Conformational Characteristics of Ethers and Esters of *p-tert*-Butylcalix[5]arene" Journal of the American Chemical Society, Jan. 1995, pp. 586-601, vol. 117.
Jean-Pierre Simonato et al., "Antagonistic metal-directed inductions in catalytic asymmetric aziridination by manganese and iron tetramethylchiroporphyrins", Chemical Communications, 1999, pp. 989-990.

* cited by examiner

*Primary Examiner* — D. Lawrence Tarazano
*Assistant Examiner* — J. L. Yang
(74) *Attorney, Agent, or Firm* — Buchanan Ingersoll & Rooney PC

(57) ABSTRACT

An optically anisotropic material comprising at least one discotic compound having a cyclopropylcarbonyl group. The material is excellent in both the wavelength dispersion property and the refractive index anisotropy.

17 Claims, No Drawings

OPTICALLY ANISOTROPIC MATERIAL, LIQUID CRYSTAL DISPLAY DEVICE AND TRIPHENYLENE COMPOUND

TECHNICAL FIELD

The present invention relates to an optically anisotropic material utilizing a compound having a cyclopropyl ester. The present invention also relates to a novel triphenylene compound useful for the production of an optically anisotropic layer or the like.

BACKGROUND ART

The optically anisotropic layer is formed by aligning discotic liquid crystalline molecules (disc-like liquid crystalline molecules) and fixing the aligned state. The discotic liquid crystalline molecule generally has a large birefringence, and the discotic liquid crystalline molecules are aligned in various modes. When a discotic liquid crystalline molecule is used, an optical compensatory sheet having optical properties unobtainable by conventional stretched birefringent film can be produced. *Molecular Crystals and Liquid Crystals*, Vol. 84, page 193 (1982) discloses a triphenylene-based discotic liquid crystalline molecule having a negative birefringence. In order to use this liquid crystalline molecule for the optical compensatory sheet, the entire molecule constituting the optically anisotropic layer must be uniformly aligned, that is, the discotic liquid crystalline molecules are preferably oriented in a monodomain alignment. However, conventional discotic liquid crystalline molecules are oriented in a dual-domain alignment, and alignment defects are generated at the boundary of domain. Therefore, in many cases, conventional discotic liquid crystalline molecules cannot assure optical properties necessary for the application to an optical compensatory sheet. The optical properties are dependent on the chemical structure of the discotic liquid crystalline molecule. In this respect, many kinds of discotic liquid crystalline molecules have been studied and developed so as to obtain necessary optical properties. For example, JP-A-8-50206 (the term "JP-A" as used herein means an "unexamined published Japanese patent application") proposes to use an optical compensatory sheet having an optically anisotropic layer containing a discotic liquid crystalline molecule on a transparent support.

JP-A-7-306317 and JP-A-9-104866 disclose 2,3,6,7,10,11-hexa{4-(6-acryloyloxyhexyloxy)benzoyloxy}triphenylene as a discotic liquid crystalline molecule suitable for the formation of an optically anisotropic layer of an optical compensatory sheet. Incidentally, the retardation value (Δnd) of the optical compensatory sheet is determined according to the optical properties of a liquid crystal cell to be compensated. The retardation value (Δnd) is a product of the refractive index anisotropy (Δn) of the optically anisotropic layer and the thickness (d) of the optically anisotropic layer. When the refractive index anisotropy (Δn) of the optically anisotropic layer is large, the liquid crystal cell can be compensated even if the thickness (d) of the layer is small. However, it is very difficult for the discotic liquid crystalline compounds described in JP-A-7-306317 and JP-A-9-104866 to form an optically anisotropic layer having a sufficiently large refractive index anisotropy (Δn). JP-A-2001-166147 discloses a discotic liquid crystal having a large refractive index anisotropy, but the wavelength dispersion property is worsened, that is, the wavelength dispersibility is large, and the improvement of performance is not satisfied. In general, there is a trade-off relationship between wavelength dispersion property and refractive index anisotropy, and if the refractive index anisotropy is made large, the wavelength dispersion property deteriorates. This deterioration of wavelength dispersion property disadvantageously leads to the worsening of color tint change in color display, which is one of performances of the optical compensatory sheet. Therefore, a technique of overcoming the trade-off such that when the refractive index anisotropy is made large, the wavelength dispersion property deteriorates, has been demanded.

It is known that the discotic liquid crystal phase can be roughly classified into a columnar phase where center cores of no discotic molecules are stacked in a columnar state by the effect of intermolecular force, a discotic nematic phase (ND phase) where discotic molecules are disorderly aggregated, and a chiral discotic nematic phase. As described in W. H. de jeu, *Physical properties of liquid crystalline materials*, Gordon and Breach, Science Publishers (1980), the columnar nematic phase is often found, but the discotic nematic phase is scarcely found. Furthermore, with respect to the triphenylene compound, the discotic nematic phase is found only for compounds where the 2-, 3-, 6-, 7-, 10- and 11-positions are substituted, for example, by a substituted benzoyloxy group or a cinnamoyloxy group.

DISCLOSURE OF THE INVENTION

An object of the present invention is to provide an optically anisotropic material excellent in both the wavelength dispersion property and the refractive index anisotropy. Also, an object of the present invention is to provide an optically anisotropic material contributing to reduction in the color tint change of a displayed image and improvement of the viewing angle in a liquid crystal display device. Another object of the present invention is to provide a liquid crystal display device reduced in the color tint change of a displayed image and improved in the viewing angle property. Still another object of the present invention is to provide a triphenylene compound useful for the production of an optically anisotropic layer or the like which is used for optical compensation or the like of a liquid crystal display.

The means to attain these objects are as follows.

(1) An optically anisotropic material comprising at least one discotic compound having a cyclopropyl carbonyl group.

(2) The optically anisotropic material as described in (1) above, wherein the discotic compound having a cyclopropylcarbonyl group is a compound represented by the following formula (I):

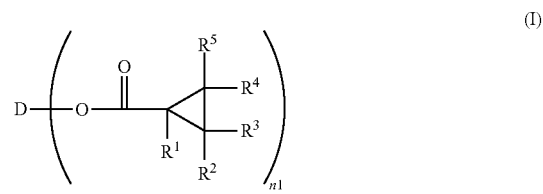

wherein D represents a discotic core, n1 represents an integer of 3 to 20, and $R^1$, $R^2$, $R^3$, $R^4$ and $R^5$ each represents a hydrogen atom or a substituent and may combine with each other to form a ring.

(3) The optically anisotropic material as described in (2) above, wherein the compound represented by formula (I) is a compound represented by the following formula (II):

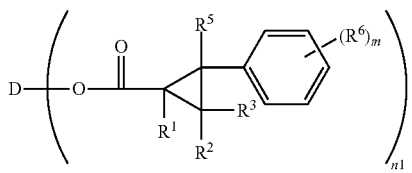

(II)

wherein D represents a discotic core, n1 represents an integer of 3 to 20, $R^1$, $R^2$, $R^3$ and $R^5$ each represents a hydrogen atom or a substituent and may combine with each other to form a ring, m represents an integer of 1 to 5, $R^6$ represents a substituent, and when multiple $R^6$s are present, these may be the same or different or may combine with each other to form a ring.

(4) The optically anisotropic material as described in (3) above, wherein $R^6$ is a halogen atom, a substituted or unsubstituted alkyl group, a substituted or unsubstituted alkoxy group, a substituted or unsubstituted alkoxycarbonyl group, a substituted or unsubstituted aryl group, a substituted or unsubstituted aryloxy group, a substituted or unsubstituted acyloxy group, a substituted or unsubstituted alkoxycarbonyloxy group, or a substituted or unsubstituted aryloxycarbonyloxy group.

(5) The optically anisotropic material as described in any one of (2) to (4) above, wherein $R^1$, $R^2$, $R^3$ and $R^5$ each is a hydrogen atom, a substituted or unsubstituted alkyl group, a cyano group, an alkoxycarbonyl group or a halogen atom.

(6) The optically anisotropic material as described in any one of (1) to (5) above, wherein the discotic compound having a cyclopropylcarbonyl group is a discotic liquid crystal.

(7) The optically anisotropic material as described in (6) above, wherein the discotic compound having a cyclopropylcarbonyl group is a discotic compound having a polymerizable group, represented by the following formula (III), the polymerizable group is polymerized in the state of the disc plane of the discotic compound being aligned, and this alignment is fixed by the polymerization:

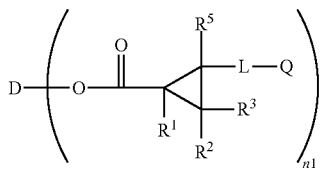

(III)

wherein D represents a discotic core, n1 represents an integer of 3 to 20, $R^1$, $R^2$, $R^3$ and $R^5$ each represents a hydrogen atom or a substituent and may combine with each other to form a ring, L represents a divalent linking group selected from an oxygen atom, a sulfur atom, a carbonyl group, a substituted or unsubstituted alkylene group, a substituted or unsubstituted arylene group and a combination thereof, and Q represents a polymerizable group.

(8) The optically anisotropic material as described in (7) above, wherein Q is an epoxy group or an ethylenically unsaturated group.

(9) The optically anisotropic material as described in any one of (1) to (8) above, wherein the discotic core is triphenylene.

(10) The optically anisotropic material as described in any one of (1) to (9) above, wherein the alignment of the discotic compound having a cyclopropylcarbonyl group is forming a discotic nematic phase.

(11) An optically anisotropic film formed from the optically anisotropic material of any one of (1) to (11) above.

(12) An optical compensatory sheet comprising a transparent support and an optically anisotropic layer formed from the optically anisotropic material of any one of (1) to (11) above.

(13) A liquid crystal display device comprising the optically anisotropic material of any one of (1) to (10) above.

(14) The liquid crystal display device of (11) above, which comprises an optically anisotropic layer formed from the optically anisotropic material.

(15) A triphenylene compound represented by the following formula (IV):

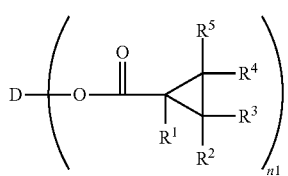

(IV)

wherein D represents triphenylene, n1 represents an integer of 3 to 6, and $R^1$, $R^2$, $R^3$, $R^4$ and $R^5$ each represents a hydrogen atom, a substituted or unsubstituted alkyl group having from 1 to 20 carbon atoms, a substituted or unsubstituted alkenyl group having from 3 to 20 carbon atoms, a substituted or unsubstituted alkoxy group having from 1 to 20 carbon atoms, a substituted or unsubstituted alkenyloxy group having from 3 to 20 carbon atoms, a substituted or unsubstituted aryl group having from 6 to 20 carbon atoms, a substituted or unsubstituted aryloxy group having from 6 to 20 carbon atoms, or a substituted or unsubstituted alkoxycarbonyl group having from 1 to 20 carbon atoms.

(16) The triphenylene compound as described in (15) above, wherein when $R^4$ represents a substituted or unsubstituted alkyl group having from 3 to 20 carbon atoms, a substituted or unsubstituted alkoxy group having from 3 to 20 carbon atoms, a substituted or unsubstituted aryl group having from 6 to 20 carbon atoms or a substituted or unsubstituted aryloxy group having from 6 to 20 carbon atoms and at the same time, $R^4$ has a substituent, a polymerizable group is present at the terminal of the substituent.

(17) The triphenylene compound as described in (15) above, wherein when $R^4$ represents a substituted or unsubstituted aryl group having from 6 to 20 carbon atoms and at the same time, $R^4$ has a substituent, a polymerizable group is present at the terminal of the substituent.

(18) The triphenylene compound as described in (16) or (17) above, wherein the polymerizable group is an epoxy group or an ethylenically unsaturated group.

According to the present invention, an optically anisotropic material useful for the production of an optically anisotropic layer can be provided. The compound having a cyclopropylcarbonyl moiety within the molecule, preferably the discotic compound defined by formula (I), exhibits liquid crystallinity by itself or in the presence of another additive and by the alignment of the compound, an optically anisotropic layer having a small wavelength dispersion property and a large refractive index anisotropy can be formed. Accordingly, by using the compound of the present invention, an optically anisotropic material such as retardation plate contributing to reduction in the color tint change of a displayed image as well as enlargement of the viewing angle when used for a liquid crystal display, can be provided. Furthermore, by using the discotic compound defined by formula (I), an optically anisotropic layer exhibiting the desired retardation despite a thin layer can be formed and this contributes to thinning of a liquid crystal display device. When the novel triphenylene compound represented by formula (IV) is used, these effects are more remarkably expressed.

BEST MODE FOR CARRYING OUT THE INVENTION

The present invention is described in detail below. In the present invention, any notation using a word "to" indicates a range defined by values placed before and after such word, where both ends of such range are included as minimum and maximum values.

(Discotic Compound Having Cyclopropylcarbonyl Group)

The discotic compound having a cyclopropylcarbonyl group for use in the present invention is preferably a compound represented by the following formula (I):

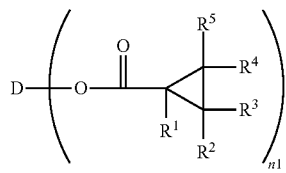
(I)

In formula (I), D is a discotic core. The discotic core is positioned in the center of the discotic compound and constitutes its disc plane. The discotic core is a well-known concept in discussing the molecular structure of the discotic liquid crystalline molecule. The discotic liquid crystal is described in various publications such as C. Destrade et al., *Mol. Crysr. Liq. Cryst.*, Vol. 71, page 111 (1981); Japan Chemical Society (compiler), "Ekisho no Kagaku (Chemistry of Liquid Crystal)", *Quarterly Chemical Review*, No. 22, Chapters 5 and 10, Section 2 (1994); B. Kohne et al., *Angew. Chem. Soc. Chem. Comm.*, page 1794 (1985); and J. Zhang et al., *J. Am. Chem. Soc.*, Vol. 116, page 2655 (1994).

Examples of the discotic core are set forth below. In each compound, Y means the following formula (VI). In formula (VI), $R^1$, $R^2$, $R^3$, $R^4$ and $R^5$ have the same meanings as in formula (I), and respective preferred ranges are also the same.

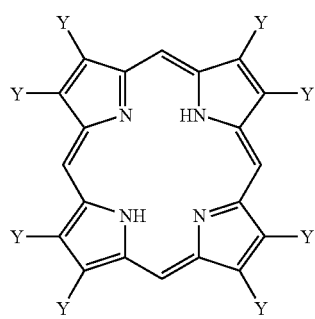
(VI)

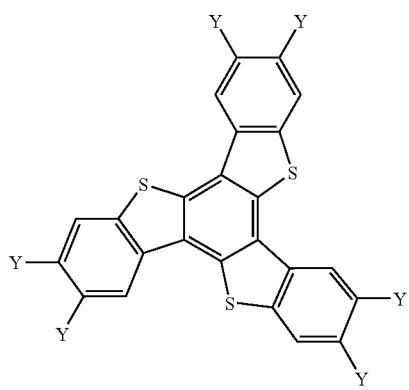
(Z1)

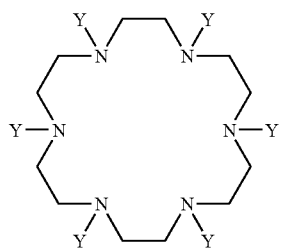
(Z2)

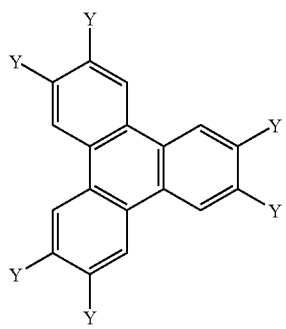
(Z3)

(Z4)

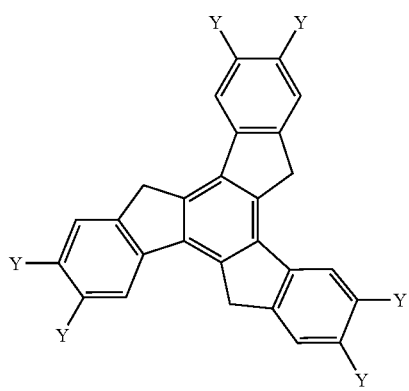
(Z5)

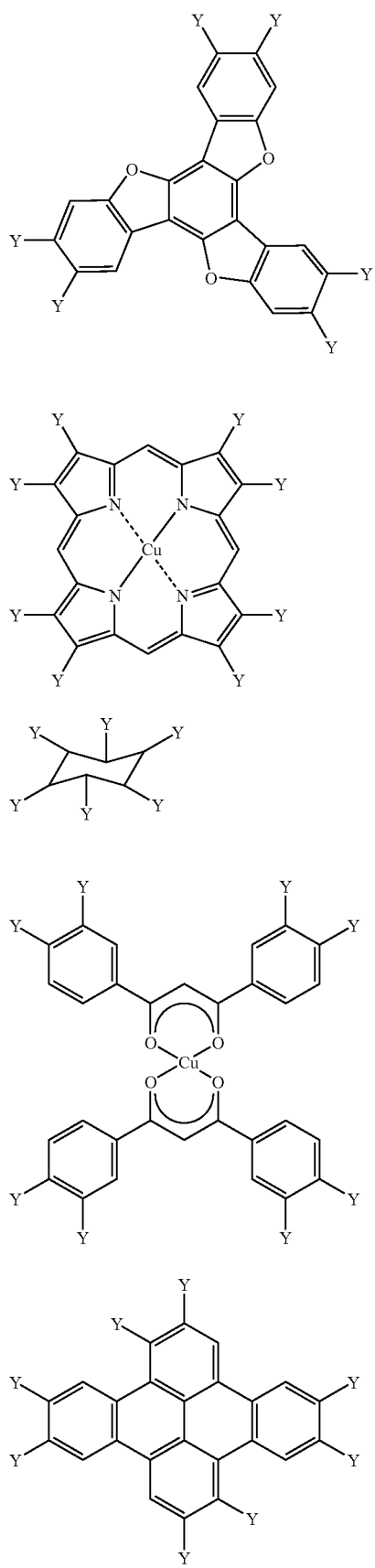
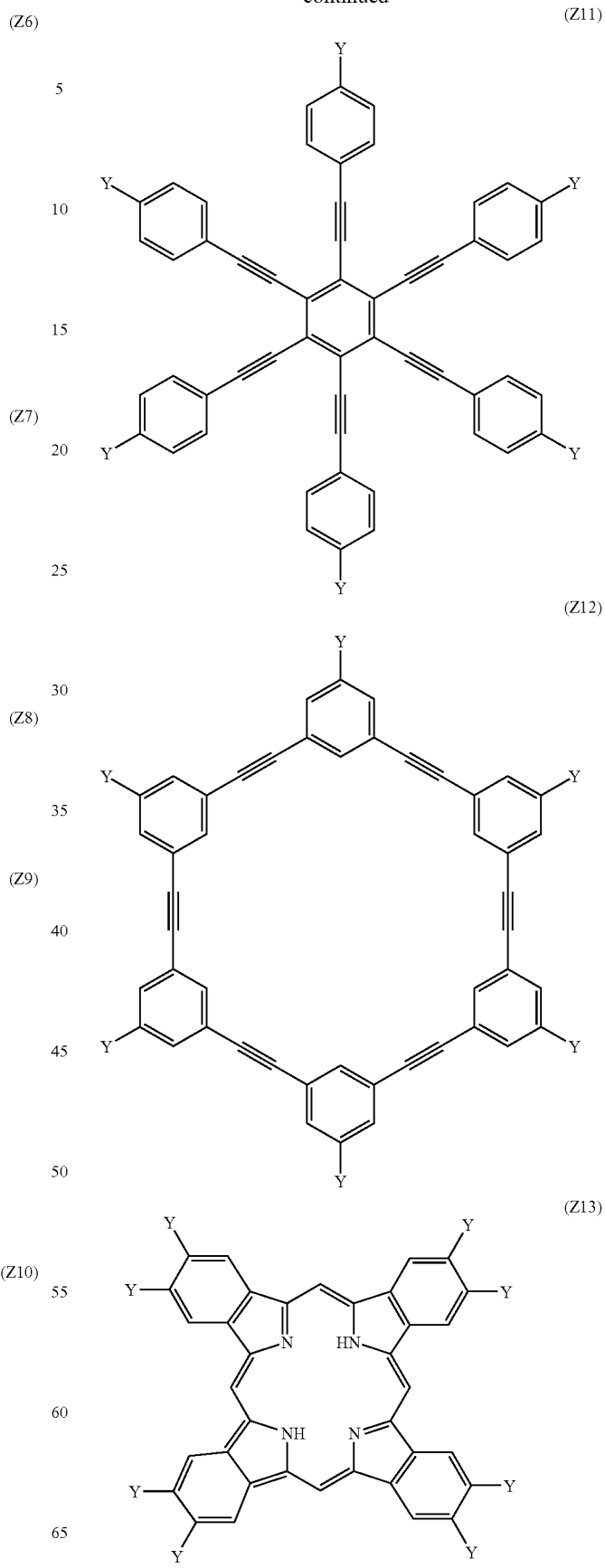

-continued

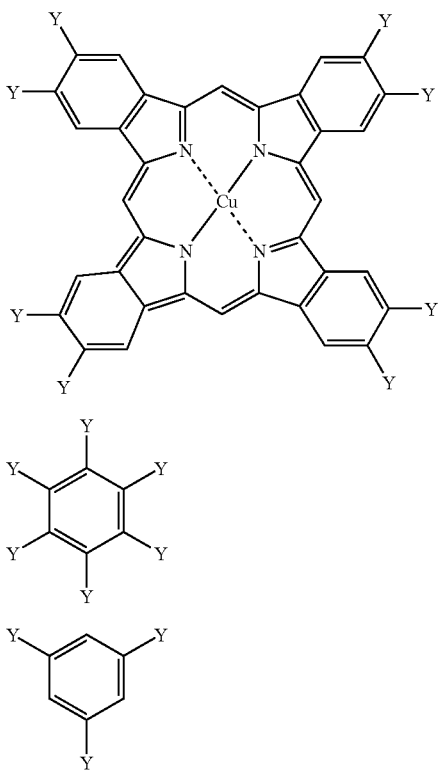

(Z14)

(Z15)

(Z16)

The discotic core (D) is preferably triphenylene (Z4).

The discotic core (D) may have a substituent other than Y (formula (VI)). Examples of the substituent which the discotic core may have include a halogen atom (e.g., fluorine, chlorine, bromine, iodine), a cyano group, a hydroxyl group, an amino group, a carbamoyl group, a sulfamoyl group, a mercapto group, a ureido group, an alkyl group, a substituted alkyl group, an alkenyl group, a substituted alkenyl group, an alkynyl group, a substituted alkynyl group, an aryl group, a substituted aryl group, a heterocyclic group, an alkoxy group, a substituted alkoxy group, an aryloxy group, a substituted aryloxy group, an acyl group, an acyloxy group, an alkoxycarbonyl group, a substituted alkoxycarbonyl group, an aryloxycarbonyl group, a substituted aryloxycarbonyl group, a substituted amino group, an amido group, an imido group, an alkoxycarbonylamino group, a substituted alkoxycarbonylamino group, an aryloxycarbonylamino group, a substituted aryloxycarbonylamino group, a substituted carbamoyl group, a sulfonamido group, a substituted sulfamoyl group, an alkylthio group, a substituted alkylthio group, an arylthio group, a substituted arylthio group, an alkylsulfonyl group, a substituted alkylsulfonyl group, an arylsulfonyl group, a substituted arylsulfonyl group, an alkylsulfinyl group, a substituted alkylsulfinyl group, an arylsulfinyl group, a substituted arylsulfinyl group, a substituted ureido group, a phosphoric acid amide group, a substituted silyl group, an alkoxycarbonyloxy group, a substituted alkoxycarbonyloxy group, an aryloxycarbonyloxy group and a substituted aryloxycarbonyloxy group.

The alkyl group may have a cyclic structure or a branched structure. The number of carbon atoms in the alkyl group is preferably from 1 to 30. The alkyl moiety of the substituted alkyl group has the same meaning as the alkyl group, and the preferred range is also the same. Examples of the substituent for the substituted alkyl group are the same as those of the substituent for the discotic core, except for excluding an alkyl group, a substituted alkyl group, an alkenyl group, a substituted alkenyl group, an alkynyl group and a substituted alkynyl group.

The alkenyl group may have a cyclic structure or a branched structure. The number of carbon atoms in the alkenyl group is preferably from 2 to 30. The alkenyl moiety of the substituted alkenyl group has the same meaning as the alkenyl group, and the preferred range is also the same. Examples of the substituent for the substituted alkenyl group are the same as those of the substituent for the substituted alkyl group. The alkynyl group may have a cyclic structure or a branched structure. The number of carbon atoms in the alkynyl group is preferably from 2 to 30. The alkynyl moiety of the substituted alkynyl group has the same meaning as the alkynyl group. Examples of the substituent for the substituted alkynyl group are the same as those of the substituent for the substituted alkyl group, and the preferred range is also the same.

The number of carbon atoms in the aryl group is preferably from 6 to 30. The aryl moiety of the substituted aryl group has the same meaning as the aryl group, and the preferred range is also the same. Examples of the substituent for the substituted aryl group are the same as those of the substituent for the discotic core, and the preferred range is also the same.

The heterocyclic group preferably has a 5- or 6-membered heterocyclic ring. The heterocyclic ring may be condensed with another heterocyclic ring, an aliphatic ring or an aromatic ring. The heteroatom of the heterocyclic ring is preferably a nitrogen atom, an oxygen atom or a sulfur atom. The heterocyclic group may have a substituent. Examples of the substituent for the heterocyclic group are the same as those of the substituent for the discotic core, and the preferred range is also the same.

The alkyl moiety in the alkoxy group and substituted alkoxy group has the same meaning as the alkyl group, and the preferred range is also the same. Examples of the substituent for the substituted alkoxy group are the same as those of the substituent for the substituted alkyl group, and the preferred range is also the same. The aryl moiety in the aryloxy group and substituted aryloxy group has the same meaning as the aryl group, and the preferred range is also the same. Examples of the substituent for the substituted aryloxy group are the same as those of the substituent for the discotic core, and the preferred range is also the same.

The acyl group is formyl or represented by —CO—R, wherein R is an alkyl group, a substituted alkyl group, an alkenyl group, a substituted alkenyl group, an alkynyl group, a substituted alkynyl group, an aryl group or a substituted aryl group. The acyloxy group is formyloxy or represented by —O—CO—R, wherein R is an alkyl group, a substituted alkyl group, an alkenyl group, a substituted alkenyl group, an alkynyl group, a substituted alkynyl group, an aryl group or a substituted aryl group.

The alkyl moiety in the alkoxycarbonyl group and substituted alkoxycarbonyl group has the same meaning as the alkyl group. Examples of the substituent for the substituted alkoxycarbonyl group are the same as those of the substituent for the substituted alkyl group, and the preferred range is also the same.

The aryl moiety in the aryloxycarbonyl group and substituted aryloxycarbonyl group has the same meaning as the aryl group, and the preferred range is also the same. Examples of the substituent for the substituted aryloxycarbonyl group are the same as those of the substituent for the discotic core, and the preferred range is also the same.

The substituted amino group is represented by —NH—R or —N(—R)$_2$, wherein R is an alkyl group, a substituted alkyl group, an alkenyl group, a substituted alkenyl group, an alkynyl group, a substituted alkynyl group, an aryl group or a substituted aryl group.

The amido group is represented by —NH—CO—R, wherein R is an alkyl group, a substituted alkyl group, an alkenyl group, a substituted alkenyl group, an alkynyl group, a substituted alkynyl group, an aryl group or a substituted aryl group.

The imido group is represented by —N(—CO—R)$_2$, wherein R is an alkyl group, a substituted alkyl group, an alkenyl group, a substituted alkenyl group, an alkynyl group, a substituted alkynyl group, an aryl group or a substituted aryl group.

The alkyl moiety in the alkoxycarbonylamino group and substituted alkoxycarbonylamino group has the same meaning as the alkyl group, and the preferred range is also the same. Examples of the substituent for the substituted alkoxycarbonylamino group are the same as those of the substituent for the substituted alkyl group.

The aryl moiety in the aryloxycarbonylamino group and substituted aryloxycarbonylamino group has the same meaning as the aryl group, and the preferred range is also the same. Examples of the substituent for the substituted aryloxycarbonylamino group are the same as those of the substituent for the discotic core.

The substituted carbamoyl group is represented by —CO—NH—R or —CO—N(—R)$_2$, wherein R is an alkyl group, a substituted alkyl group, an alkenyl group, a substituted alkenyl group, an alkynyl group, a substituted alkynyl group, an aryl group or a substituted aryl group.

The sulfonamido group is represented by —NH—SO$_2$—R, wherein R is an alkyl group, a substituted alkyl group, an alkenyl group, a substituted alkenyl group, an alkynyl group, a substituted alkynyl group, an aryl group or a substituted aryl group. The substituted sulfamoyl group is represented by —SO$_2$—NH—R or —SO$_2$—N(—R)$_2$, wherein R is an alkyl group, a substituted alkyl group, an alkenyl group, a substituted alkenyl group, an alkynyl group, a substituted alkynyl group, an aryl group or a substituted aryl group.

The alkyl moiety in the alkylthio group and substituted alkylthio group has the same meaning as the alkyl group.

Examples of the substituent for the substituted alkylthio group are the same as those of the substituent for the substituted alkyl group.

The aryl moiety in the arylthio group and substituted arylthio group has the same meaning as the aryl group, and the preferred range is also the same. Examples of the substituent for the substituted arylthio group are the same as those of the substituent for the discotic core.

The alkyl moiety in the alkylsulfonyl group and substituted alkylsulfonyl group has the same meaning as the alkyl group, and the preferred range is also the same. Examples of the substituent for the substituted alkylsulfonyl group are the same as those of the substituent for the substituted alkyl group, and the preferred range is also the same.

The aryl moiety in the arylsulfonyl group and substituted arylsulfonyl group has the same meaning as the aryl group, and the preferred range is also the same. Examples of the substituent for the substituted arylsulfonyl group are the same as those of the substituent for the discotic core, and the preferred range is also the same.

The alkyl moiety in the alkylsulfinyl group and substituted alkylsulfinyl group has the same meaning as the alkyl group, and the preferred range is also the same. Examples of the substituent for the substituted alkylsulfinyl group are the same as those of the substituent for the substituted alkyl group, and the preferred range is also the same.

The aryl moiety in the arylsulfinyl group and substituted arylsulfinyl group has the same meaning as the aryl group, and the preferred range is also the same. Examples of the substituent for the substituted arylsulfinyl group are the same as those of the substituent for the discotic core, and the preferred range is also the same.

The substituted ureido group is represented by —NH—CO—NH—R or —NH—CO—N(—R)$_2$, wherein R is an alkyl group, a substituted alkyl group, an alkenyl group, a substituted alkenyl group, an alkynyl group, a substituted alkynyl group, an aryl group or a substituted aryl group.

The phosphoric acid amido group is represented by —NH—O—P(=O)(—OH)—O—R or —NH—O—P(=O)(—O—R)$_2$, wherein R is an alkyl group, a substituted alkyl group, an alkenyl group, a substituted alkenyl group, an alkynyl group, a substituted alkynyl group, an aryl group or a substituted aryl group.

The substituted silyl group is represented by —SiH$_2$—R, —SiH(—R)$_2$ or —Si(—R)$_3$, wherein R is an alkyl group, a substituted alkyl group, an alkenyl group, a substituted alkenyl group, an alkynyl group, a substituted alkynyl group, an aryl group pr a substituted aryl group.

The alkyl moiety in the alkoxycarbonyloxy group and substituted alkoxycarbonyloxy group has the same meaning as the alkyl group. Examples of the substituent for the substituted alkoxycarbonyloxy group are the same as those of the substituent for the substituted alkyl group, and the preferred range is also the same.

The aryl moiety in the aryloxycarbonyloxy group and substituted aryloxycarbonyloxy group has the same meaning as the aryl group, and the preferred range is also the same. Examples of the substituent for the substituted aryloxycarbonyloxy group are the same as those of the substituent for the discotic core, and the preferred range is also the same.

In formula (I), n1 is an integer of 3 to 20, preferably an integer of 3 to 15, more preferably an integer of 3 to 12, still more preferably an integer of 3 to 10, yet still more preferably an integer of 4 to 8, and most preferably 6.

In formula (I), $R^1$, $R^2$, $R^3$, $R^4$ and $R^5$ each represents a hydrogen atom or a substituent, and examples of the substituent include those of the substituent for the discotic core. Any two of $R^1$, $R^2$, $R^3$, $R^4$ and $R^5$ may combine to form a ring, and examples of the ring include an aliphatic or aromatic ring. Preferably, $R^1$, $R^2$, $R^3$, $R^4$ and $R^5$ each independently a hydrogen atom, a substituted or unsubstituted alkyl group, a cyano group, a substituted or unsubstituted alkoxycarbonyl group or a halogen atom. More preferably, $R^1$, $R^2$, $R^3$ and $R^5$ are a hydrogen atom. $R^4$ is preferably a substituted aromatic ring group and examples thereof include the following groups.

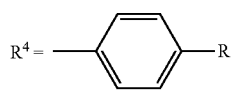

R: 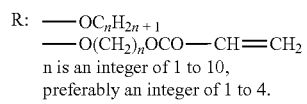

n is an integer of 1 to 10,
preferably an integer of 1 to 4.

-continued

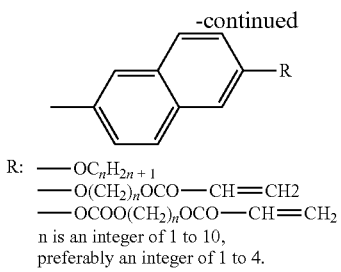

R: —$OC_nH_{2n+1}$
—$O(CH_2)_nOCO$—$CH$=$CH_2$
—$OCOO(CH_2)_nOCO$—$CH$=$CH_2$
n is an integer of 1 to 10,
preferably an integer of 1 to 4.

The pair $R^2$ and $R^3$ and the pair $R^4$ and $R^5$ each is in the cis·trans positional relationship with respect to the carbonyloxy group. The "cis" means a state such that a substituent is present in the same direction as the carbonyloxy group with respect to the cyclopropane ring, and the "trans" means a state such that a substituent is present in the direction opposite the carbonyloxy group with respect to the cyclopropane ring face. Unless specifically indicated, this positional relationship is not particularly limited.

In formula (I), depending on the combination of substituents $R^1$, $R^2$, $R^3$, $R^4$ and $R^5$, stereoisomers of enantiomer and diastereomer are present, but unless specifically indicated, these are not particularly limited.

The discotic compound represented by formula (I) is preferably represented by the following formula (II):

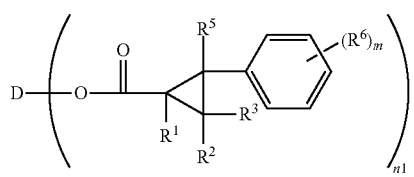

(II)

In formula (II), D represents a discotic core, n1 represents an integer of 3 to 20, $R^1$, $R^2$, $R^3$ and $R^5$ each represents a hydrogen atom or a substituent and may combine with each other to form a ring, m represents an integer of 1 to 5, $R^6$ represents a substituent, and when multiple $R^6$s are present, these may be the same or different or may combine with each other to form a ring.

D, n1, $R^1$, $R^2$, $R^3$ and $R^5$ have the same meanings as D, n1, $R^1$, $R^2$, $R^3$ and $R^5$ defined in formula (I), and respective preferred ranges are also the same.

In formula (II), $R^6$ represents a substituent, and examples thereof include those of the substituent for the discotic core. $R^6$ is preferably a halogen atom, a substituted or unsubstituted alkyl group, a substituted or unsubstituted aryl group, a substituted or unsubstituted aryloxy group, a substituted or unsubstituted alkoxycarbonyloxy group, a substituted or unsubstituted aryloxycarbonyloxy group, or a substituted or unsubstituted acyloxy group. More preferably, at least one $R^6$ is a substituted alkyl group, a substituted alkoxy group, a substituted alkoxycarbonyl group, a substituted aryl group, a substituted aryloxy group, a substituted alkoxycarbonyloxy group, a substituted aryloxycarbonyloxy group or a substituted acyloxy group, and has a polymerizable group at the terminal of the substituent.

In formula (II), unless specifically indicated, the substitution site of $R^6$ is not particularly limited. Preferably, at least one $R^6$ is present at the para-position.

In formula (II), a cis-trans positional relationship is present for $R^5$ with respect to the carbonyloxy group. Unless specifically indicated, this positional relationship is not particularly limited. A cis relationship is preferred.

The discotic compound of the present invention, for example, the discotic compound represented by formula (I), may have a polymerizable group. In the case of a discotic compound having a polymerizable group (polymerizable discotic compound), the aligned state of disc plane of the discotic compound can be fixed by the polymerization reaction.

In the case where the compound represented by formula (I) has a polymerizable group, it is preferred that $R^4$ is a substituted alkyl group, a substituted alkoxy group, a substituted aryl group or a substituted aryloxy group, and a polymerizable group is present at the terminal of the substituent.

The polymerizable discotic compound is more preferably represented by the following formula (III):

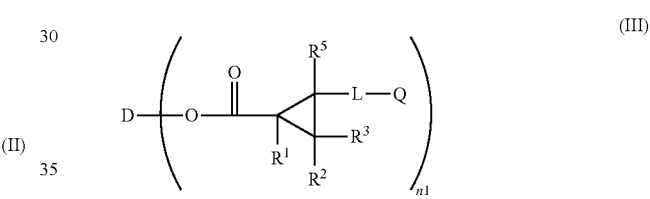

(III)

In formula (III), D represents a discotic core, n1 represents an integer of 3 to 20, and $R^1$, $R^2$, $R^3$ and $R^5$ each represents a hydrogen atom or a substituent and may combine with each other to form a ring.

D, n1, $R^1$, $R^2$, $R^3$ and $R^5$ have the same meanings as D, n1, $R^1$, $R^2$, $R^3$ and $R^5$ defined in formula (I), and respective preferred ranges are also the same.

In formula (III), L represents a divalent linking group selected from an oxygen atom, a sulfur atom, a carbonyl group, a substituted or unsubstituted alkylene group, a substituted or unsubstituted arylene group and a combination thereof.

The alkylene group may have a cyclic structure or a branched structure. The number of carbon atoms in the alkylene group is preferably from 1 to 30.

The alkylene moiety of the substituted alkylene group has the same meaning as the alkylene group. Examples of the substituent for the substituted alkylene group are the same as those of the substituent described for the discotic core in formula (I), except for excluding an alkyl group, a substituted alkyl group, an alkenyl group, a substituted alkenyl group, an alkynyl group and a substituted alkynyl group.

The number of carbon atoms in the arylene group is preferably from 1 to 30. The arylene group is preferably phenylene or naphthylene, more preferably phenylene, and most preferably p-phenylene.

The arylene moiety of the substituted arylene group has the same meaning as the arylene group. Examples of the substituent for the substituted arylene group are the same as those of the substituent described for the discotic core in formula (I).

In formula (III), Q is a polymerizable group. The polymerizable group is preferably an epoxy group or an ethylenically unsaturated group, and most preferably an ethylenically unsaturated group (e.g., vinyl, 1-propenyl, isopropenyl).

The discotic compound particularly preferred as the discotic compound for use in the present invention is a triphenylene compound represented by the following formula (IV):

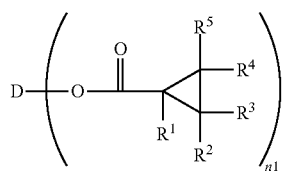

In formula (Iv), D represents triphenylene, n1 represents an integer of 3 to 6, and $R^1$, $R^2$, $R^3$, $R^4$ and $R^5$ each represents a hydrogen atom, a substituted or unsubstituted alkyl group having from 1 to 20 carbon atoms, a substituted or unsubstituted alkenyl group having from 3 to 20 carbon atoms, a substituted or unsubstituted alkoxy group having from 1 to 20 carbon atoms, a substituted or unsubstituted alkenyloxy group having from 3 to 20 carbon atoms, a substituted or unsubstituted aryl group having from 6 to 20 carbon atoms, a substituted or unsubstituted aryloxy group having from 6 to 20 carbon atoms, or a substituted or unsubstituted alkoxycarbonyl group having from 1 to 20 carbon atoms. The definition and examples of each group are the same as those in formula (I), and respective preferred ranges are also the same.

In formula (IV), $R^1$, $R^2$, $R^3$ and $R^5$ each is preferably a hydrogen atom, a methyl group, an ethyl group, a methyloxy group, an ethyloxy group, a cyano group, a halogen atom or a substituted or unsubstituted alkoxycarbonyl group.

In formula (IV), $R^4$ is preferably a substituted or unsubstituted aryl group having from 6 to 20 carbon atoms. In formula (IV), $R^4$ is preferably in a trans relationship with respect to the carbonyloxy group.

The triphenylene compound represented by formula (IV) can have a polymerizable group. In the case of a triphenylene compound having a polymerizable group (polymerizable triphenylene compound), the aligned state of disc plane comprising triphenylene can be fixed by the polymerization reaction.

In the case where the triphenylene compound represented by formula (IV) has a polymerizable group, it is preferred that $R^4$ is a substituted alkyl group having from 2 to 20 carbon atoms, a substituted alkoxy group having from 2 to 20 carbon atoms, a substituted aryl group having from 6 to 20 carbon atoms or a substituted aryloxy group having from 6 to 20 carbon atoms, and a polymerizable group is present at the terminal of the substituent.

In formula (IV), asymmetric carbon atoms are present and therefore, diastereomer or enantiomer is present, but in the present invention, these are not distinguished and all are included. That is, the stereoisomers are not distinguished by describing individual structures.

Examples of the discotic compound represented by formula (I) are set forth below. In the compounds shown below, Compound (x) is denoted by the numerical value (x) after the compound.

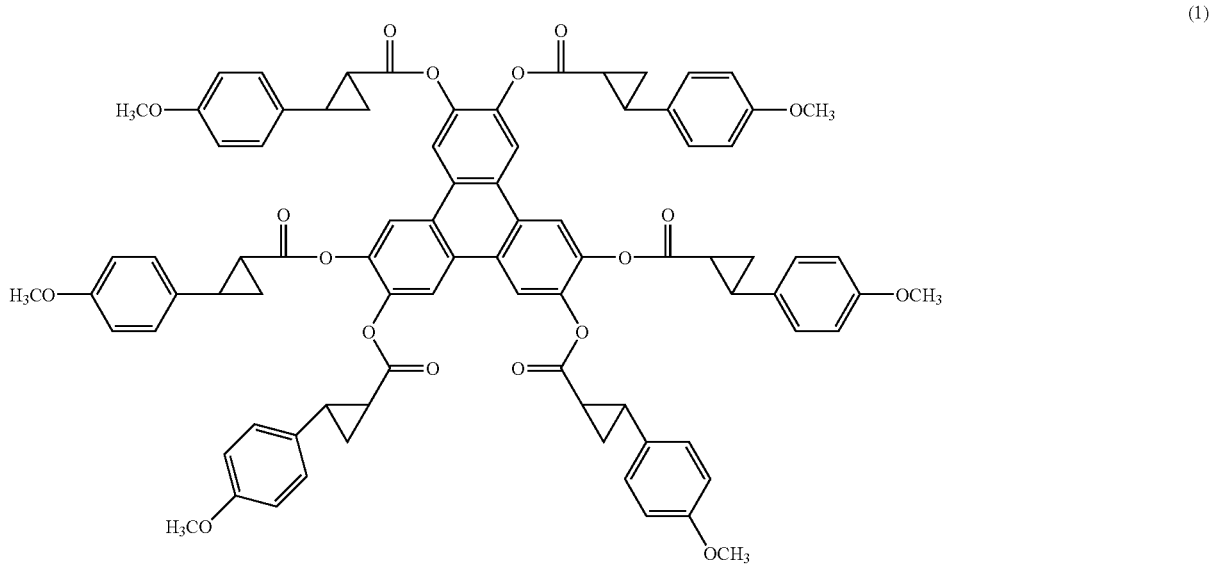

(1)

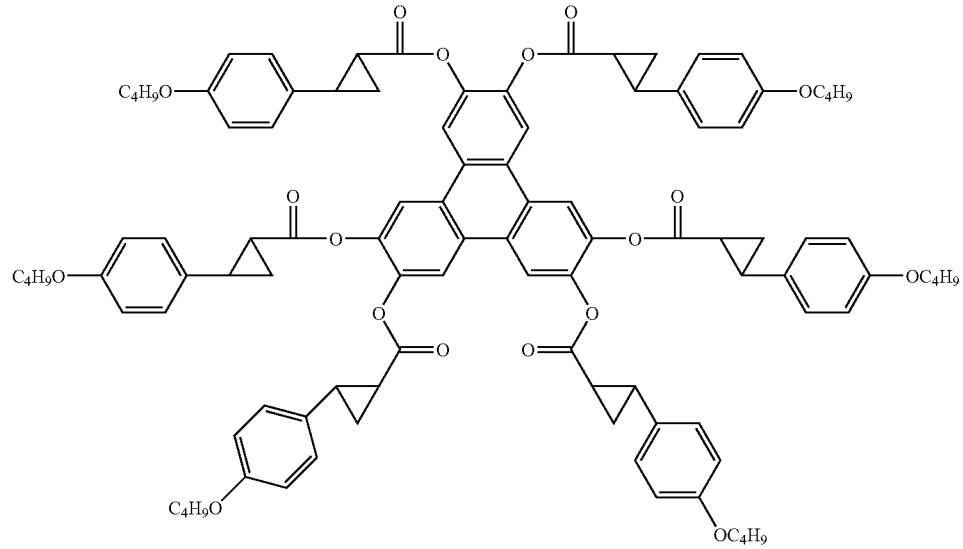
(2)
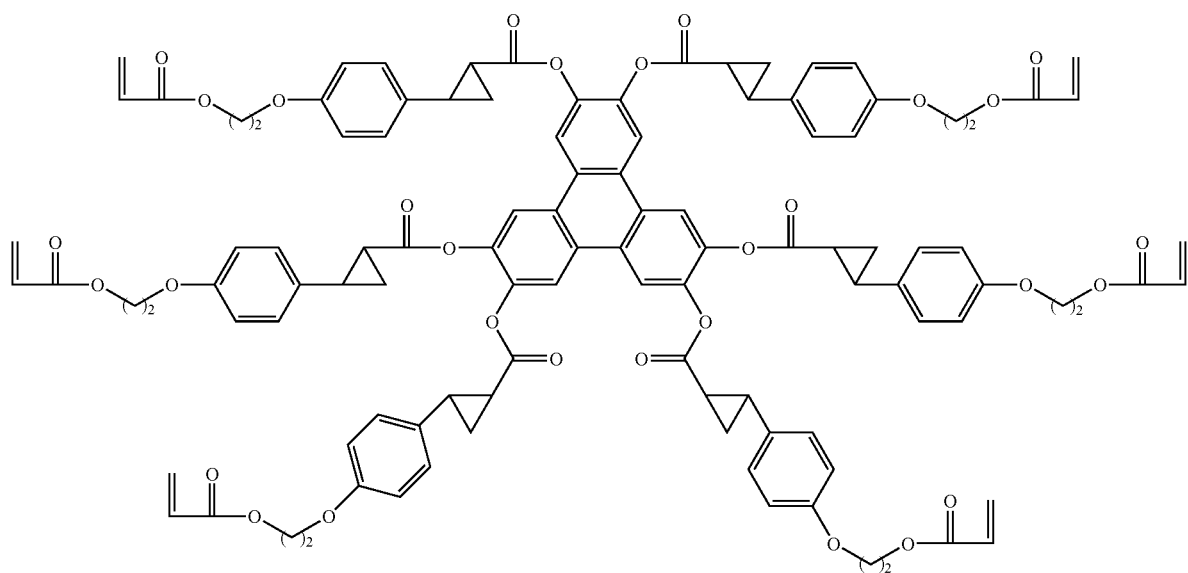
(3)

(4)
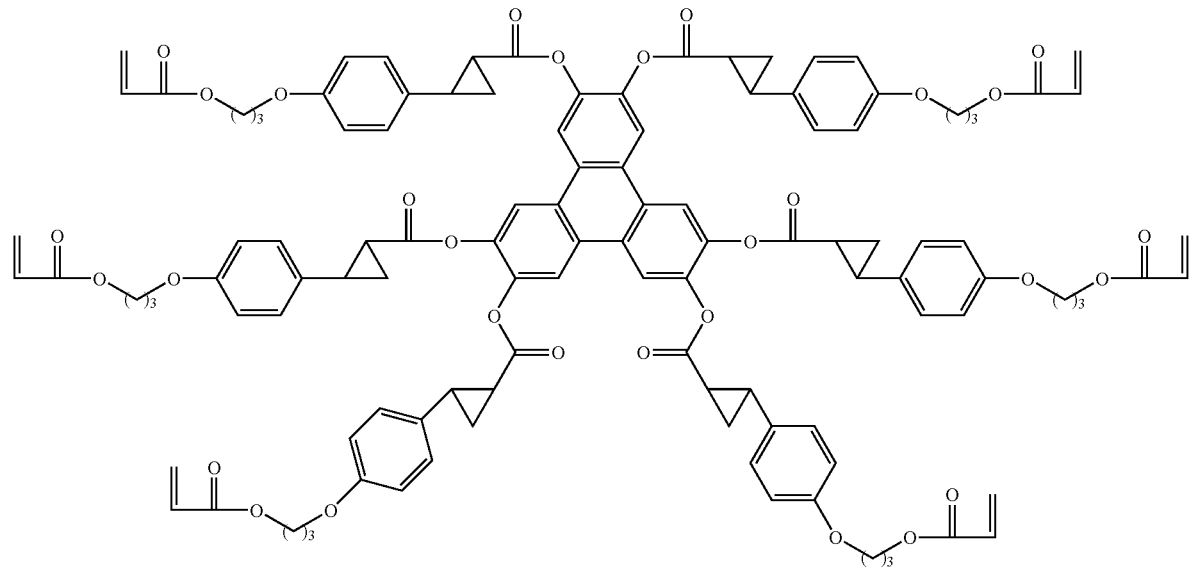
(5)
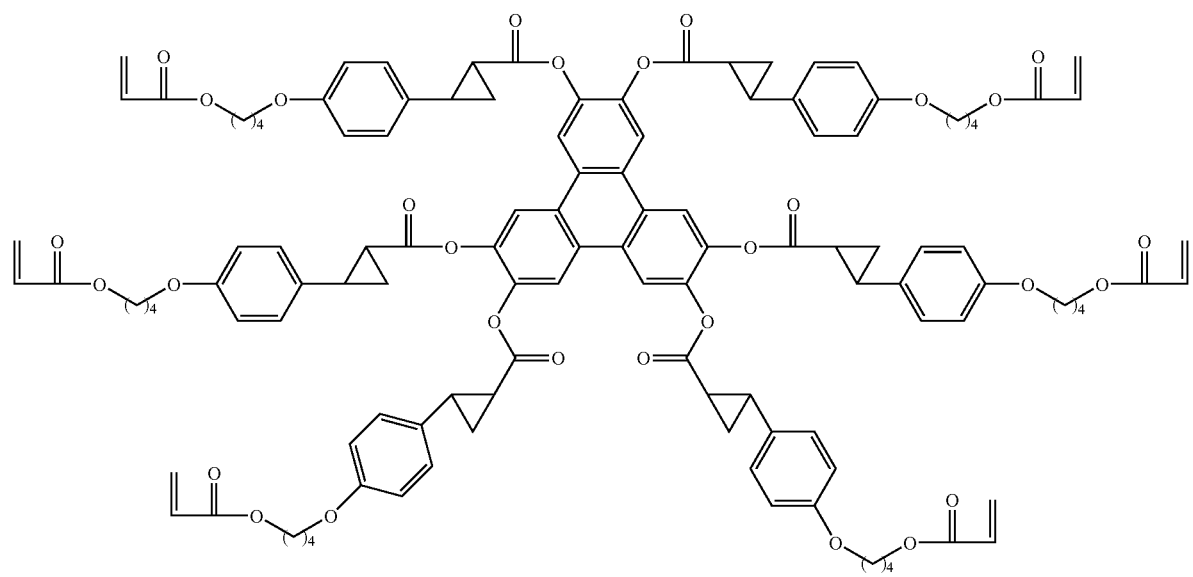

(6)
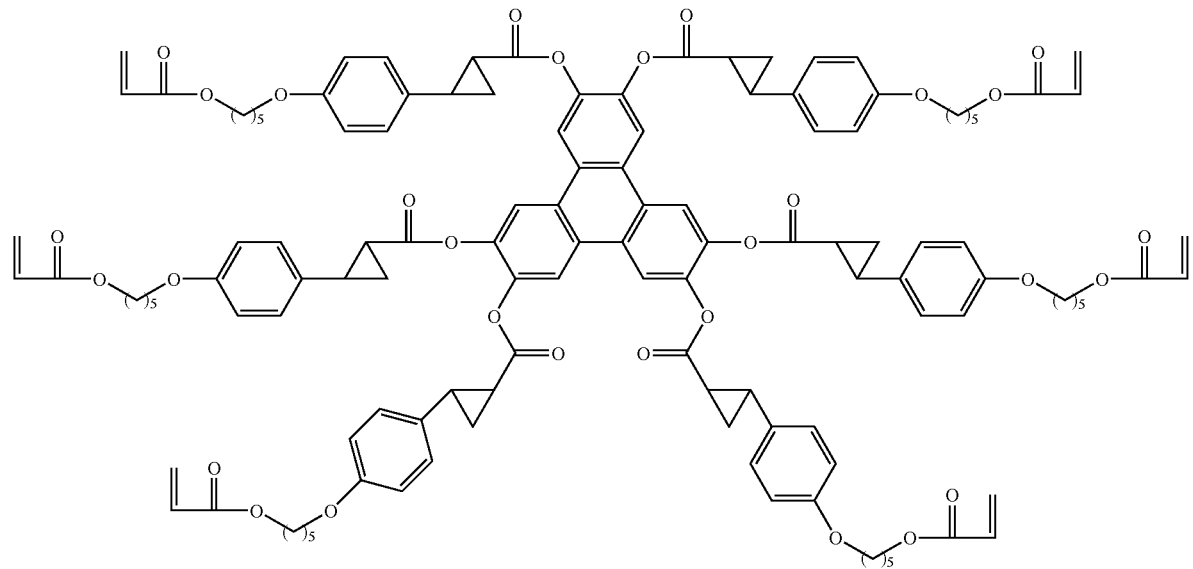
(7)
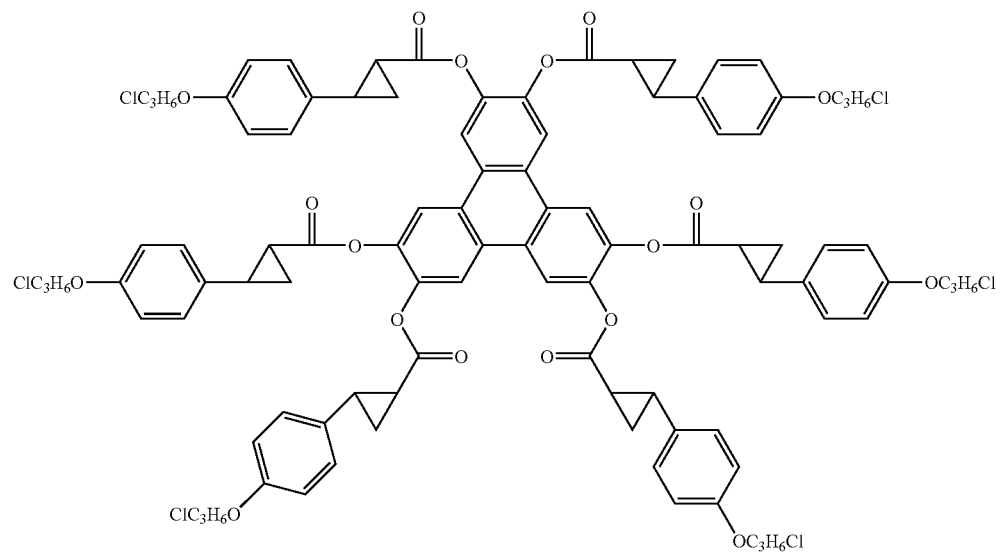

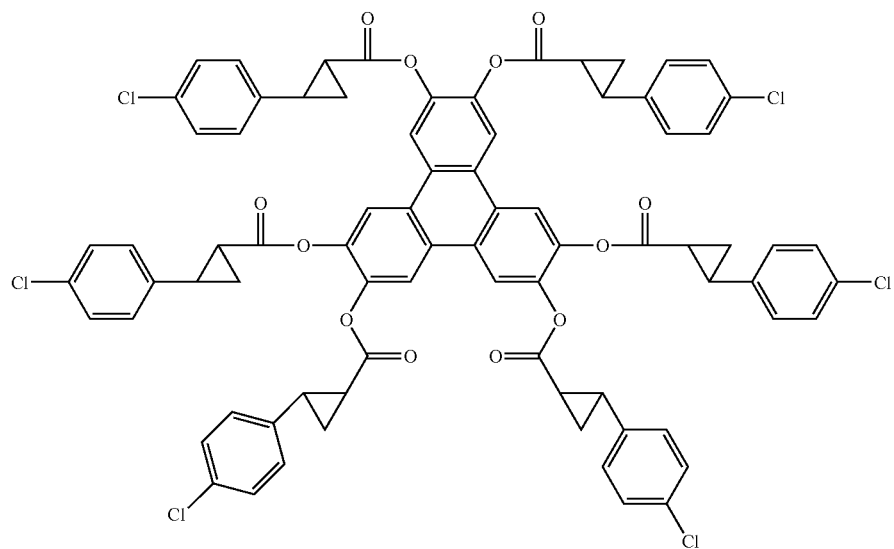
(8)
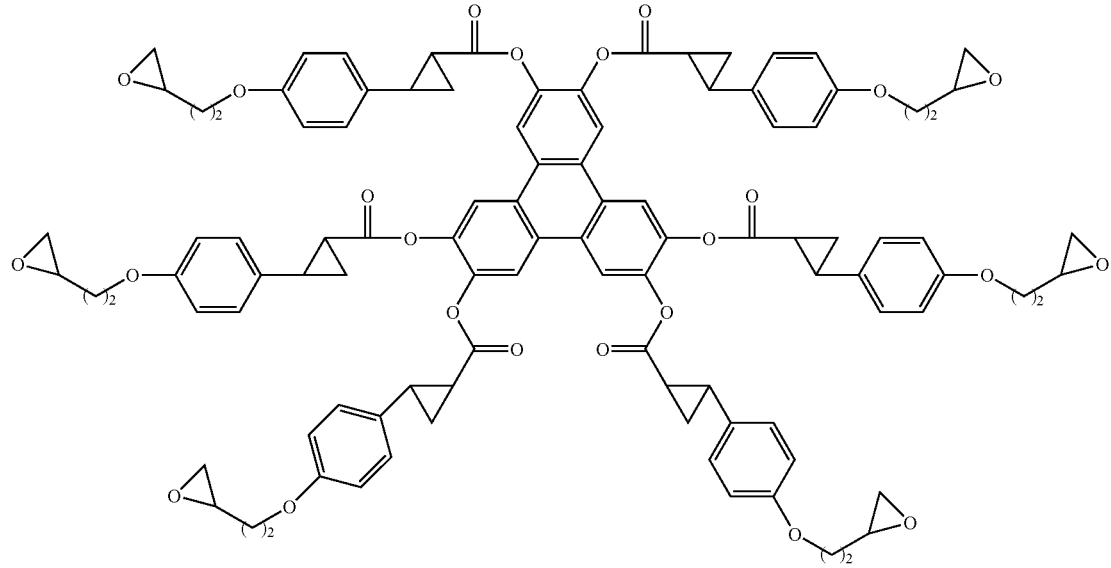
(9)

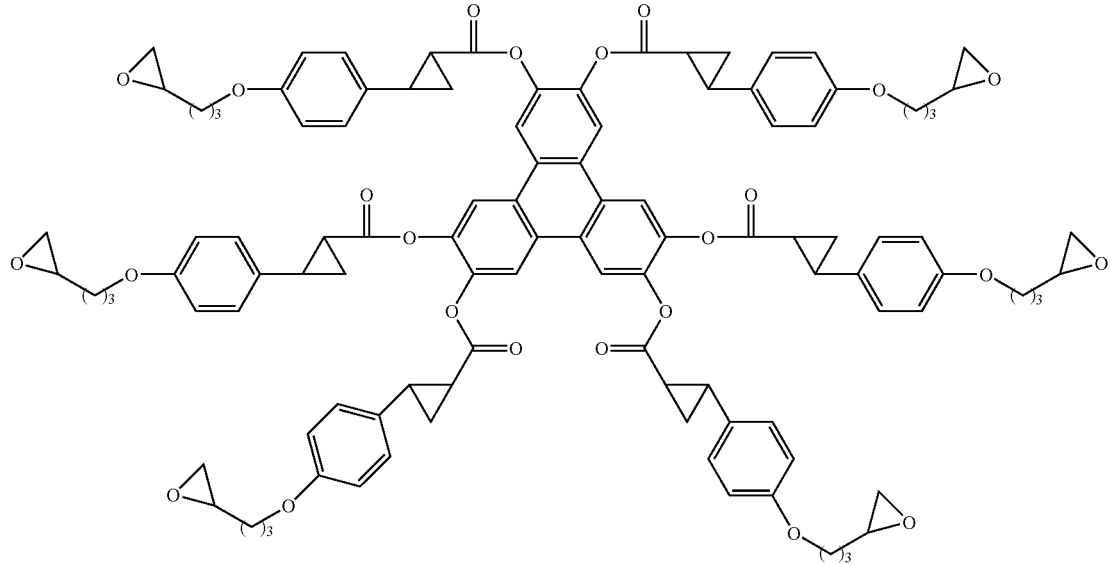
(10)
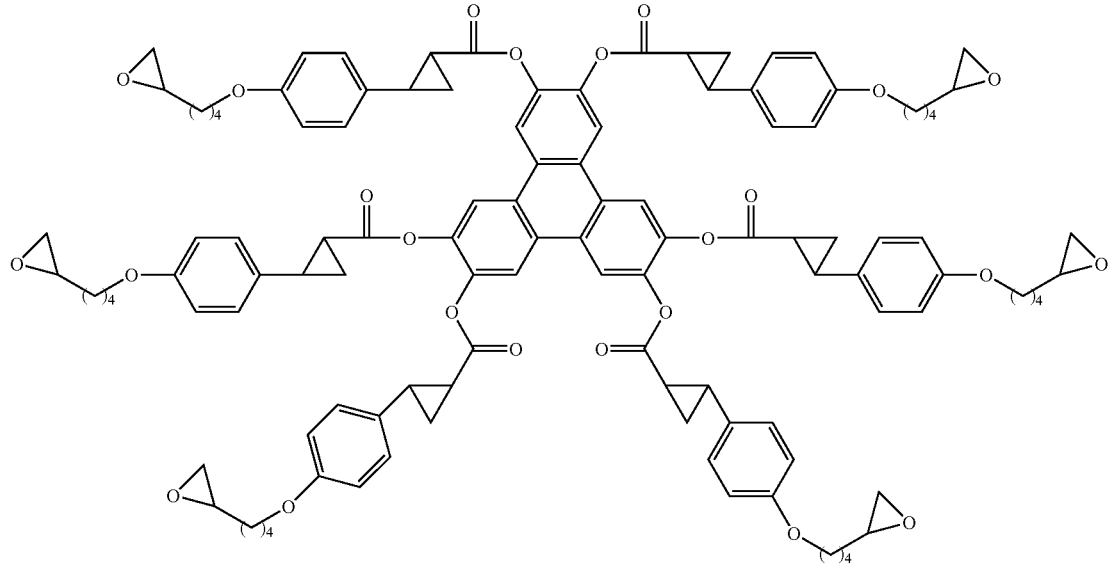
(11)

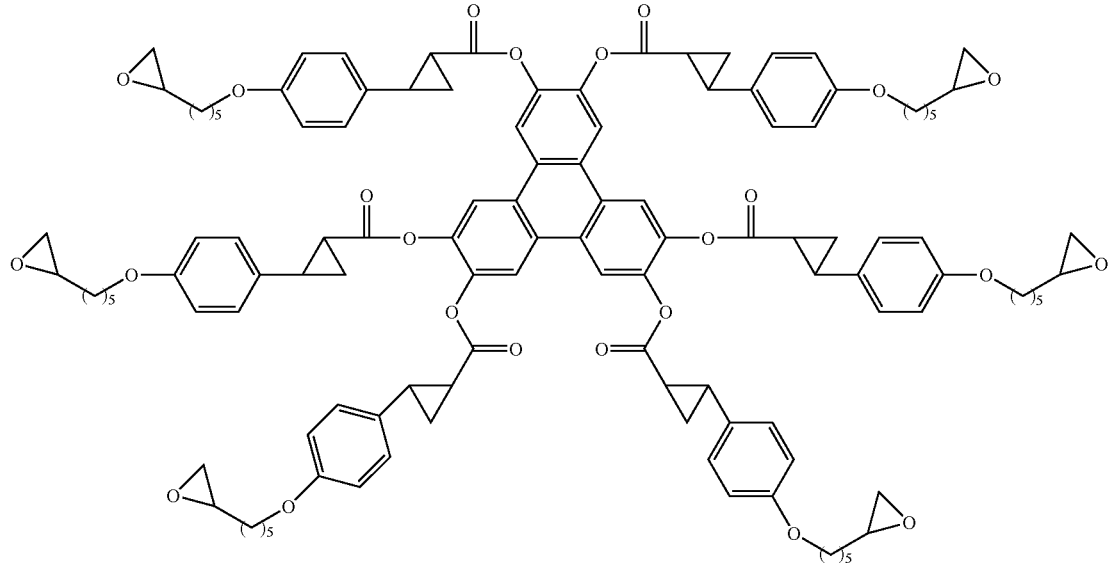
(12)
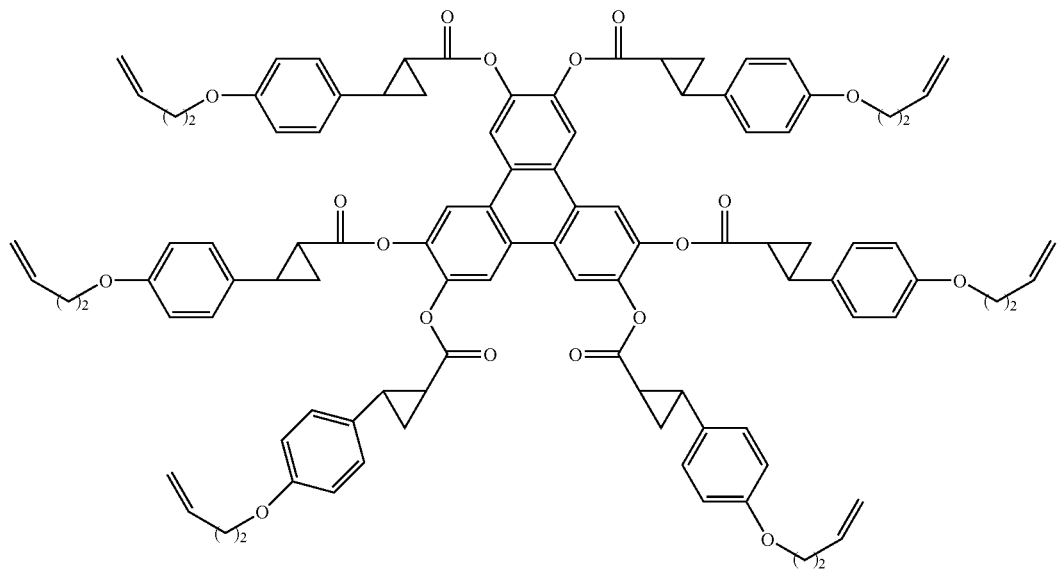
(13)

(14)
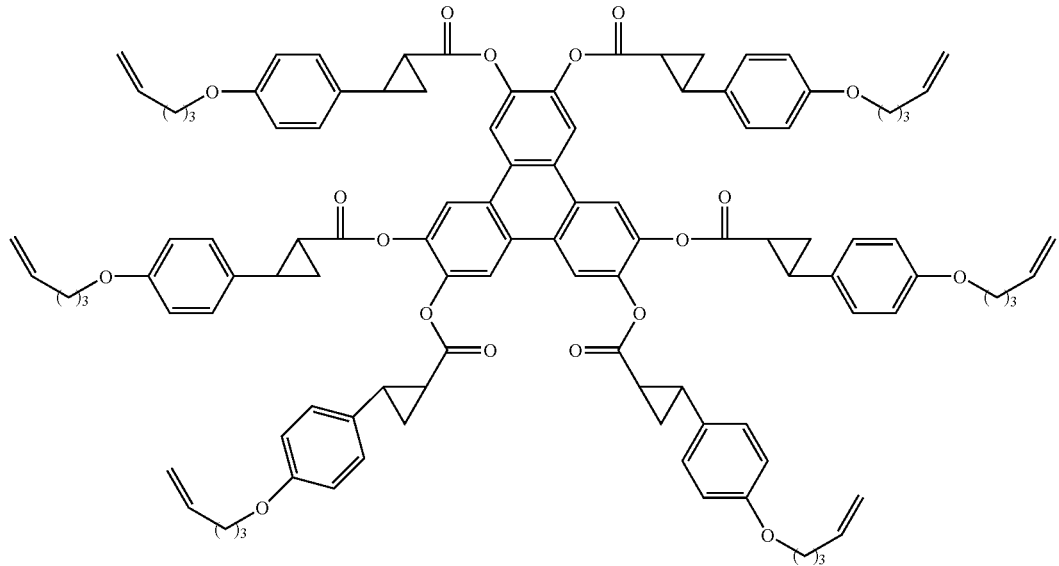
(15)
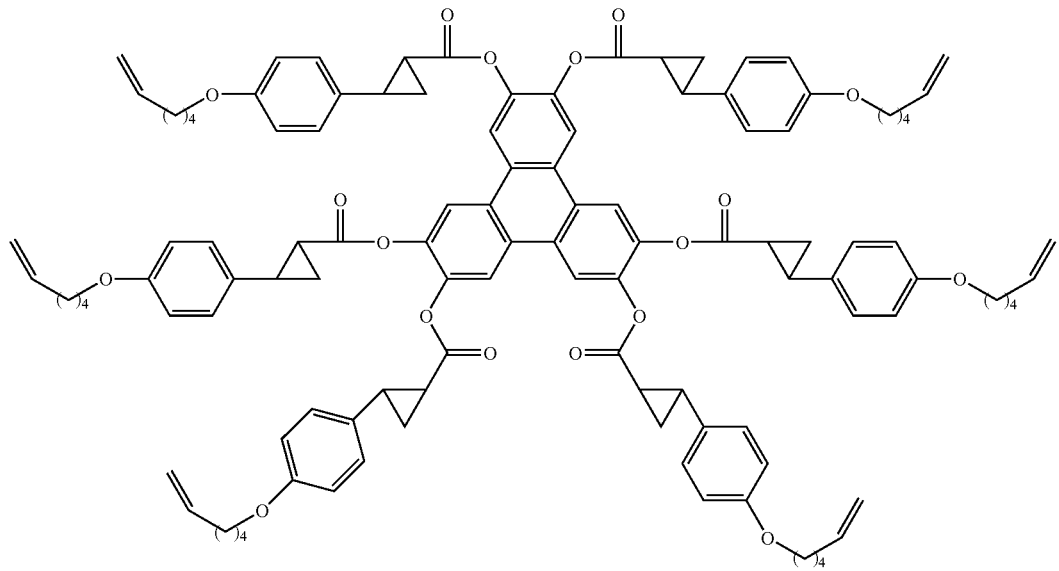

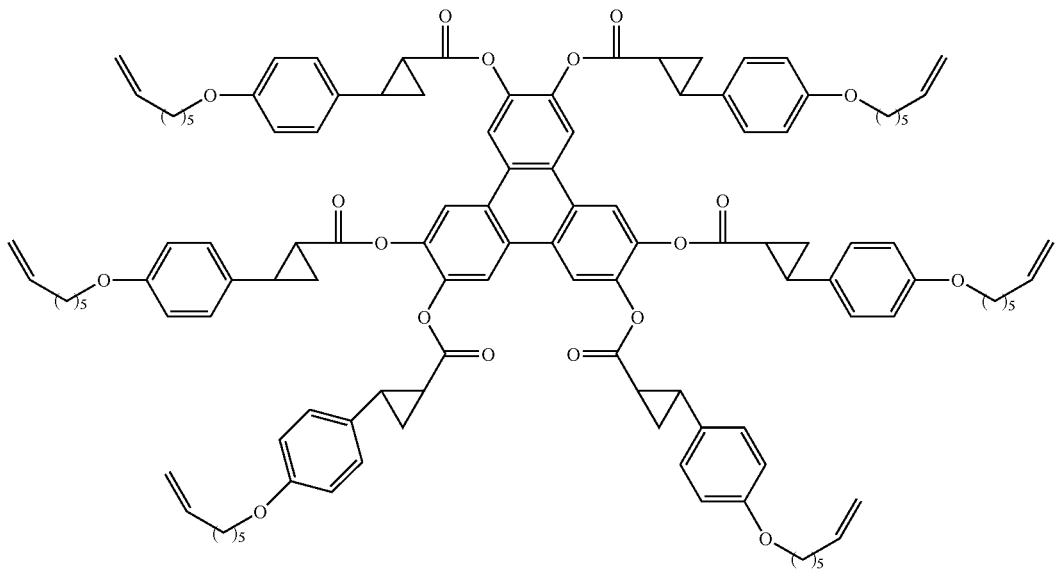
(16)
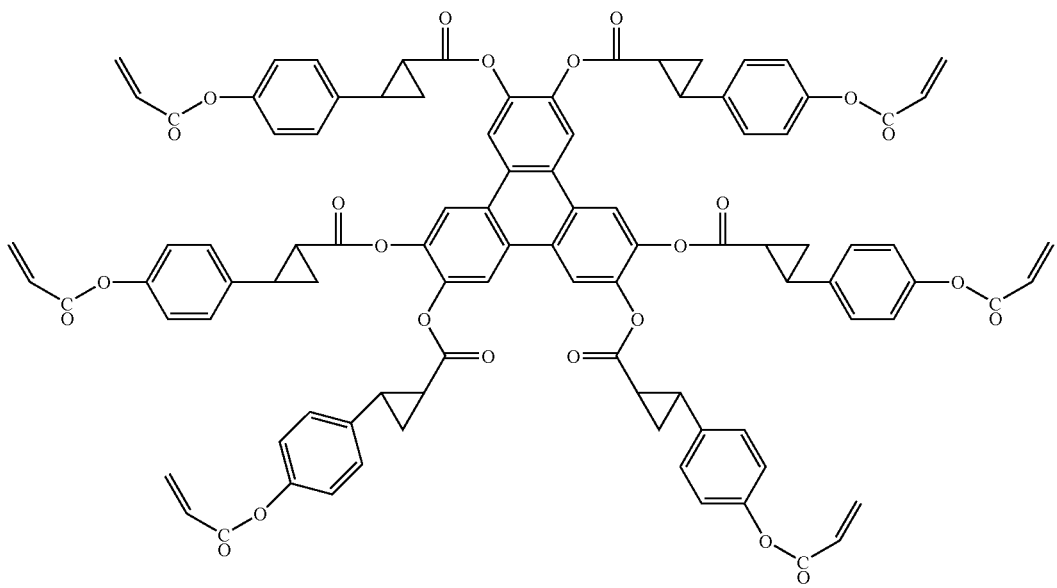
(17)
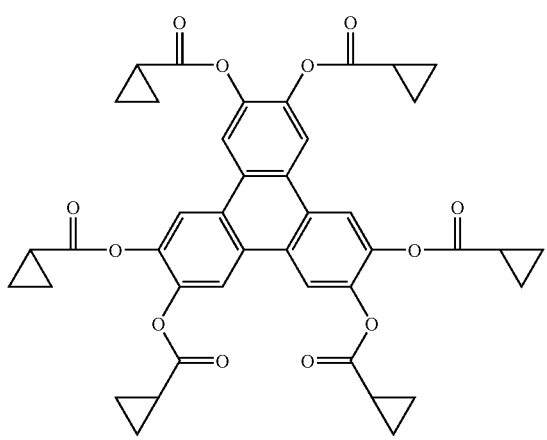
(18)

-continued
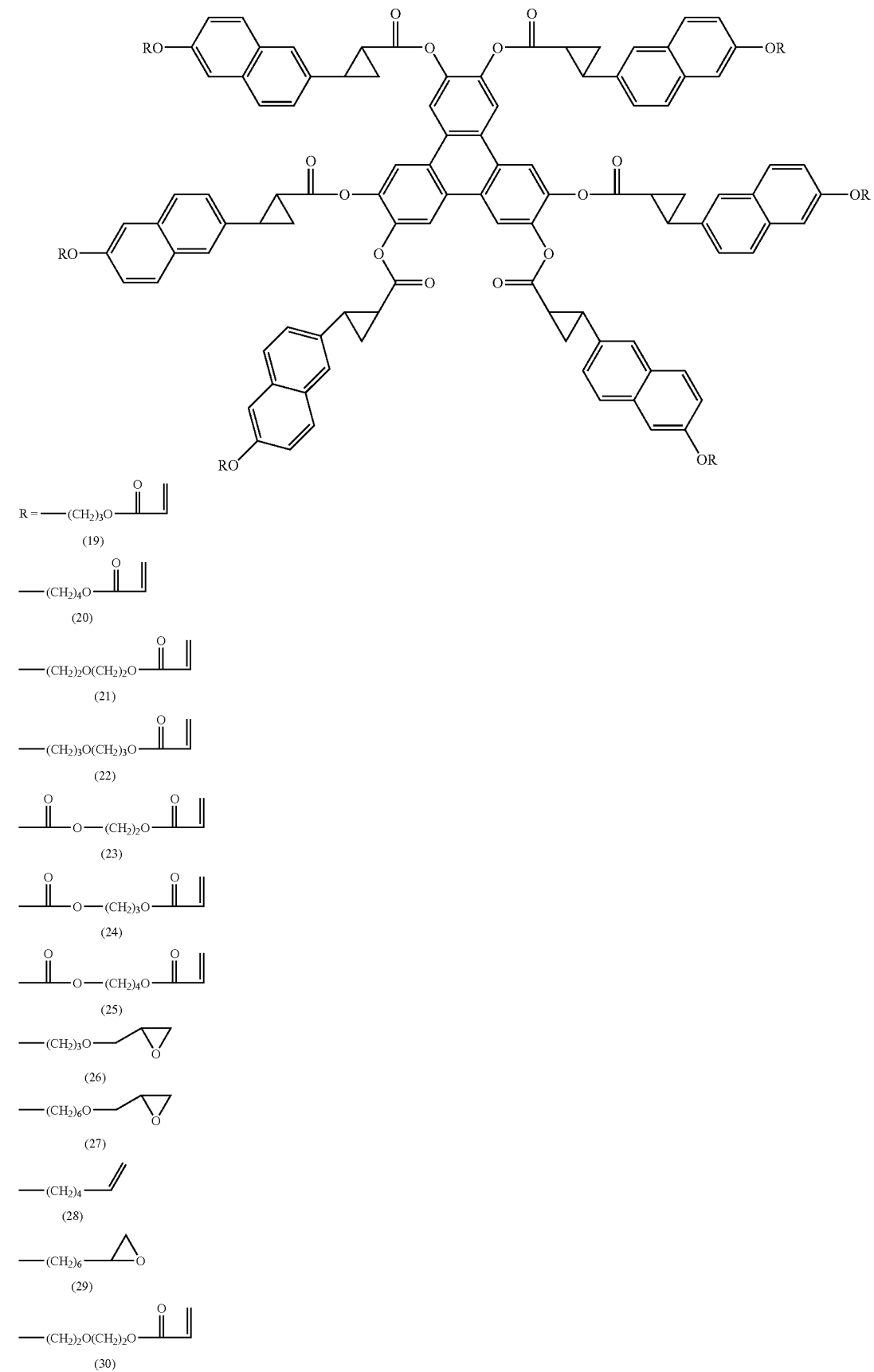

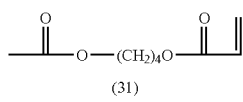
(31)
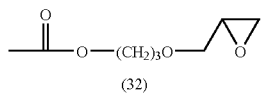
(32)
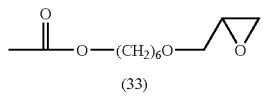
(33)
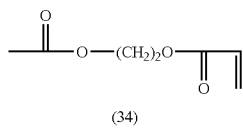
(34)
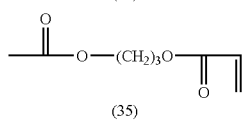
(35)
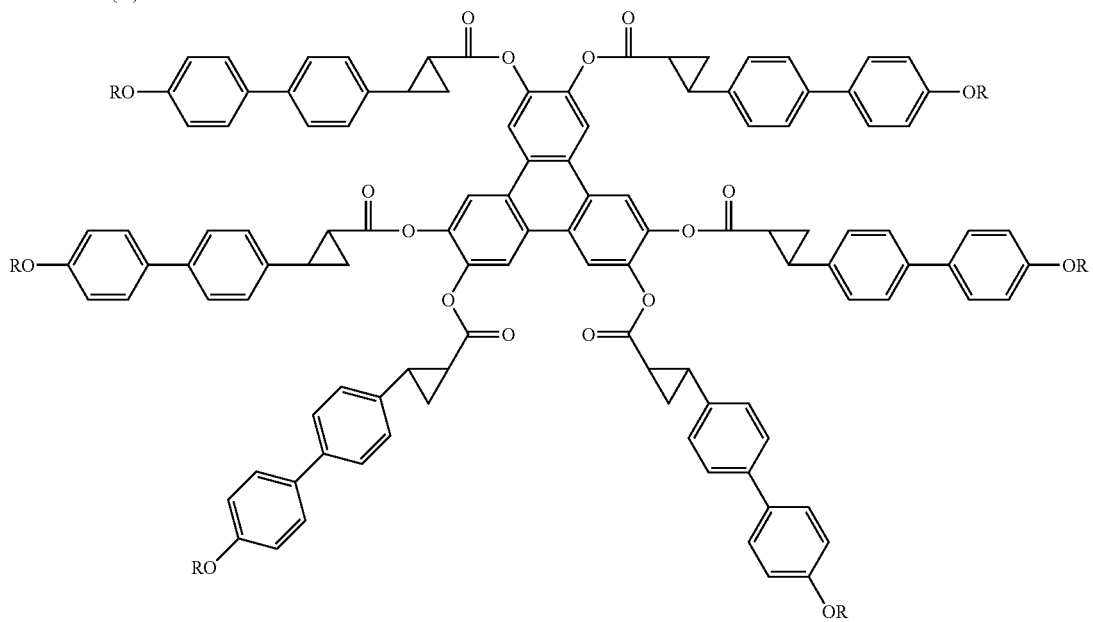
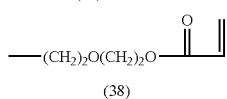
(36)
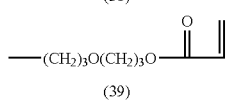
(37)
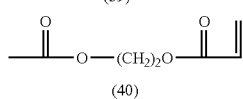
(38)
(39)
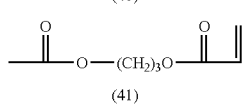
(40)
(41)

-continued

(42) CH₂=CH-C(O)-O-(CH₂)₄-O-C(O)-

(43) -(CH₂)₃O-CH₂-(epoxide)

(44) -(CH₂)₆O-CH₂-(epoxide)

(45) -(CH₂)₄-CH=CH₂

(46) -(CH₂)₆-(epoxide)

(47) -(CH₂)₂O(CH₂)₂O-C(O)-CH=CH₂

(48) CH₂=CH-C(O)-O-(CH₂)₄-O-C(O)-

(49) -(CH₂)₃O-CH₂-(epoxide), with C(O)O- linkage

(50) -(CH₂)₆O-CH₂-(epoxide), with C(O)O- linkage

(51) -(CH₂)₂O-C(O)-CH=CH₂, with C(O)- linkage

(52) -(CH₂)₃O-C(O)-CH=CH₂, with C(O)- linkage

(53) Hexakis-substituted triphenylene with six -O-C(O)-cyclopropyl-C₆H₄-OR groups, where R = -(CH₂)₂O(CH₂)₂O-C(O)-CH=CH₂

-continued
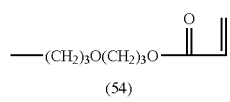
(54)
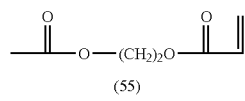
(55)
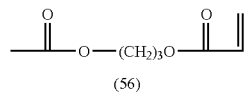
(56)
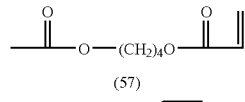
(57)
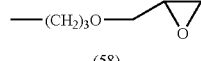
(58)
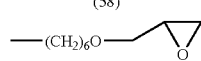
(59)
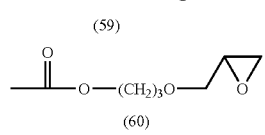
(60)
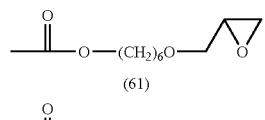
(61)
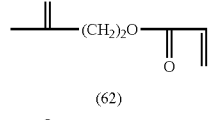
(62)
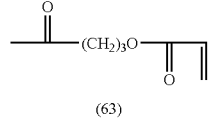
(63)
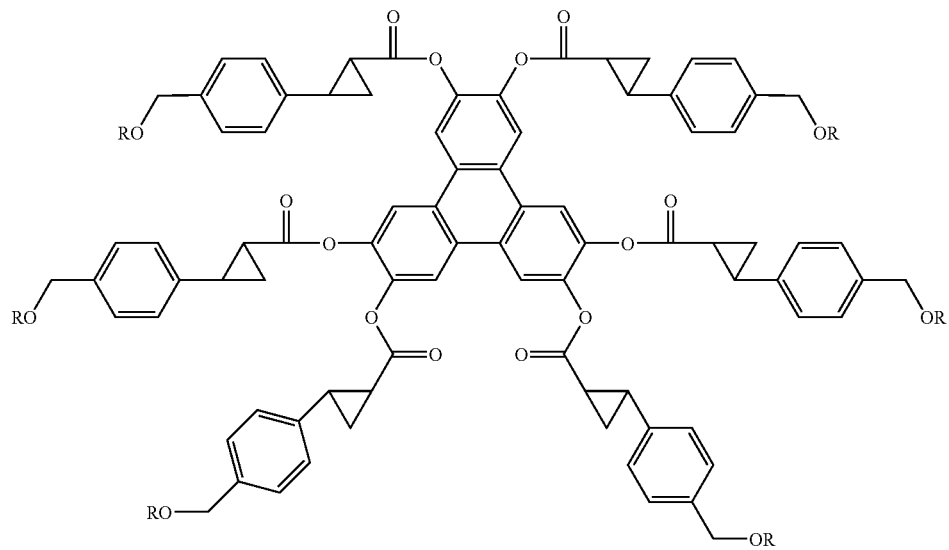
R = 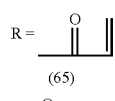
(65)
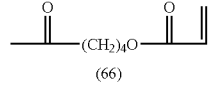
(66)

-continued
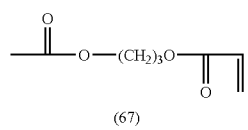
(67)
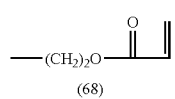
(68)
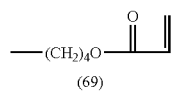
(69)
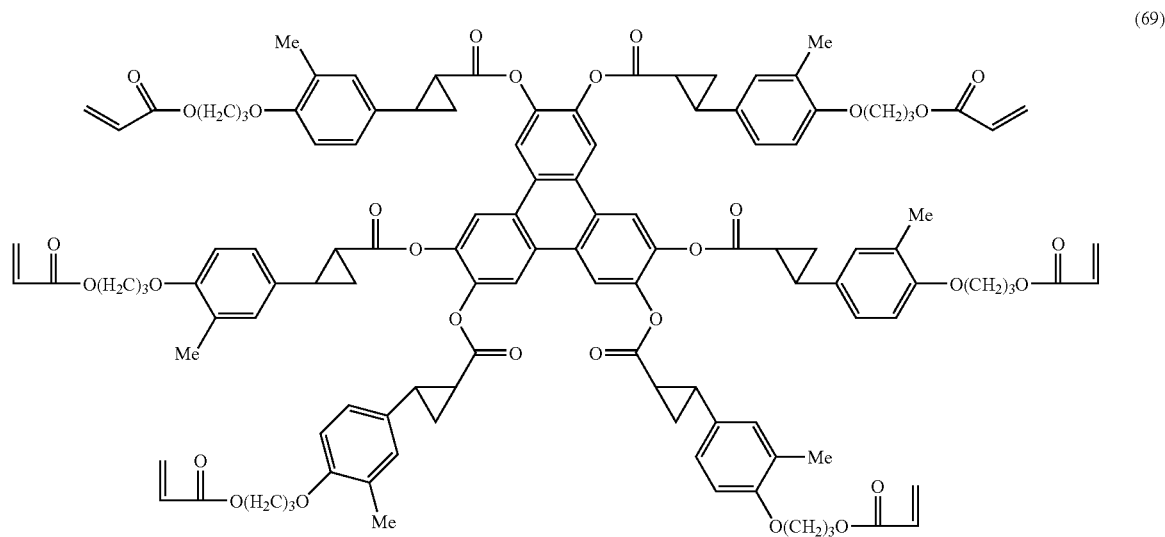
(69)
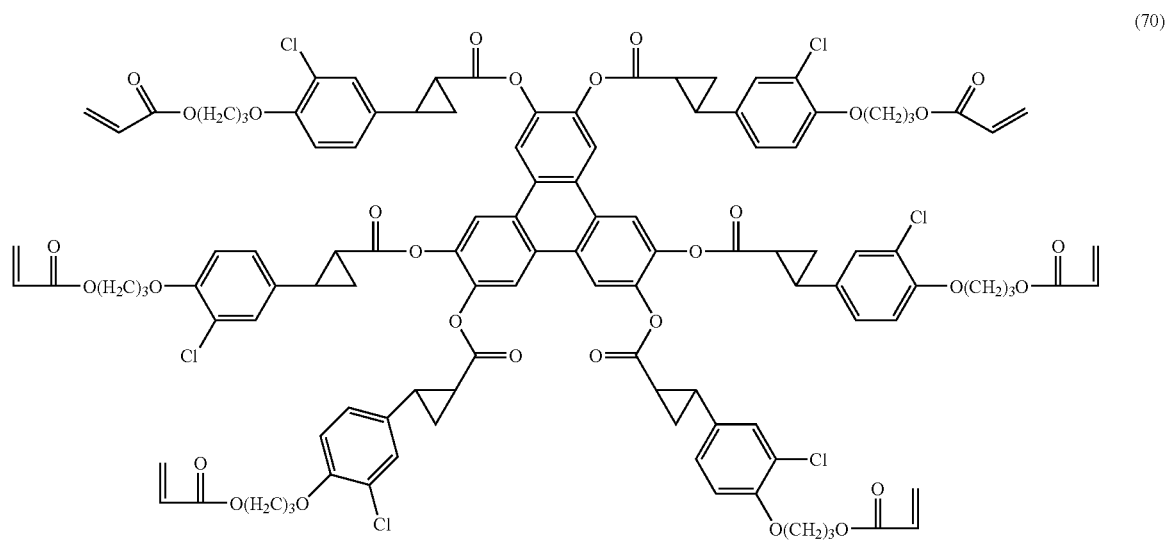
(70)

-continued
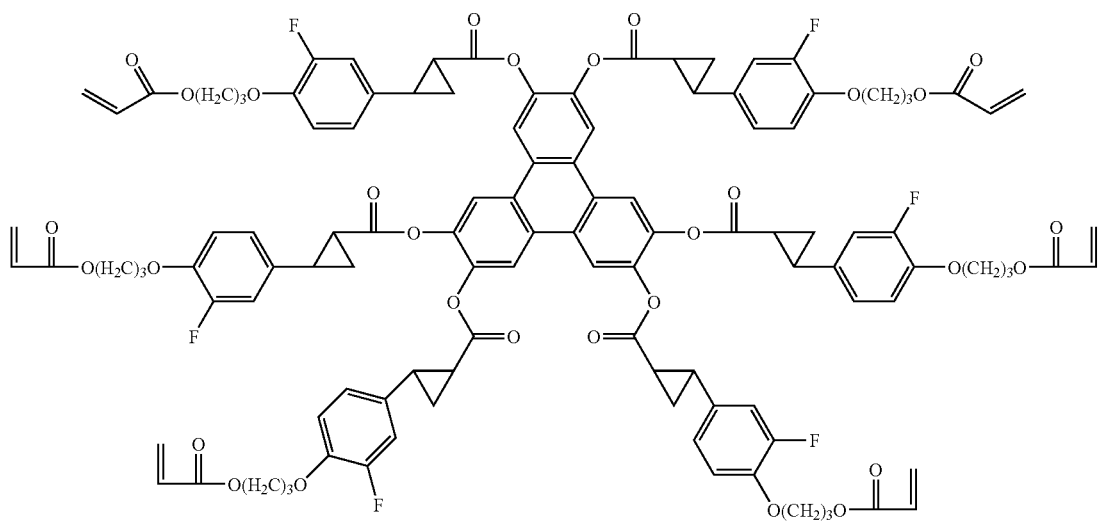
(71)
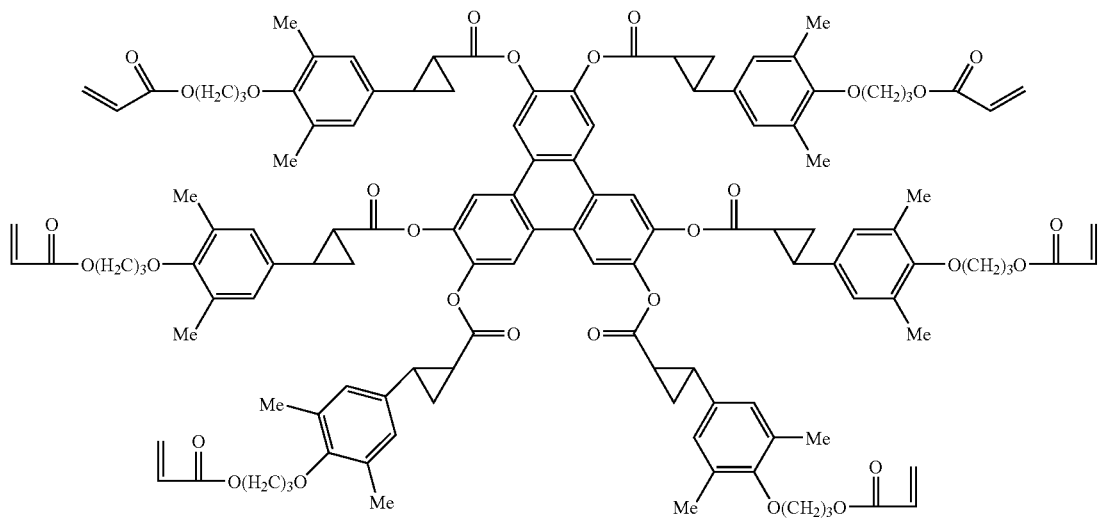
(72)
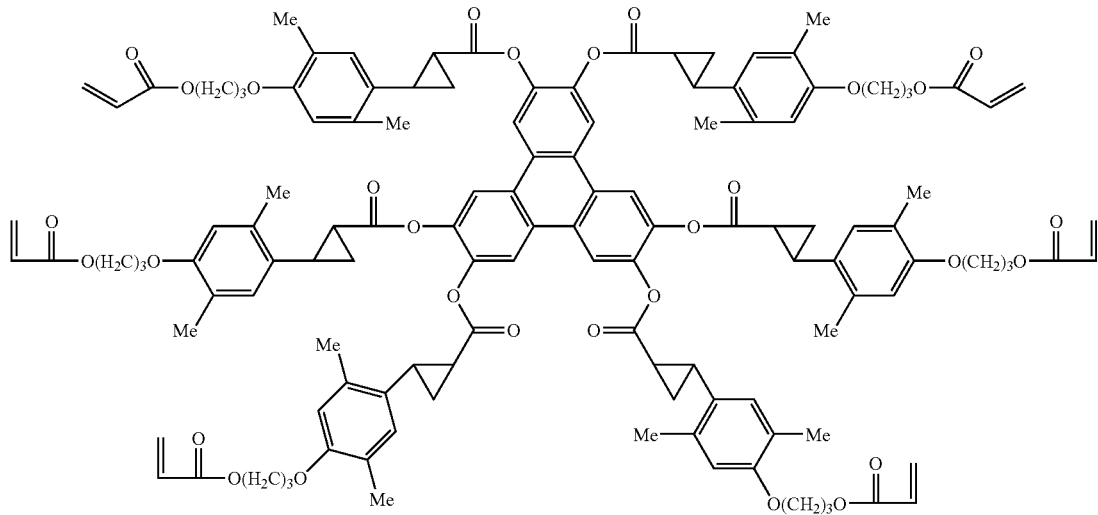
(73)

(74)
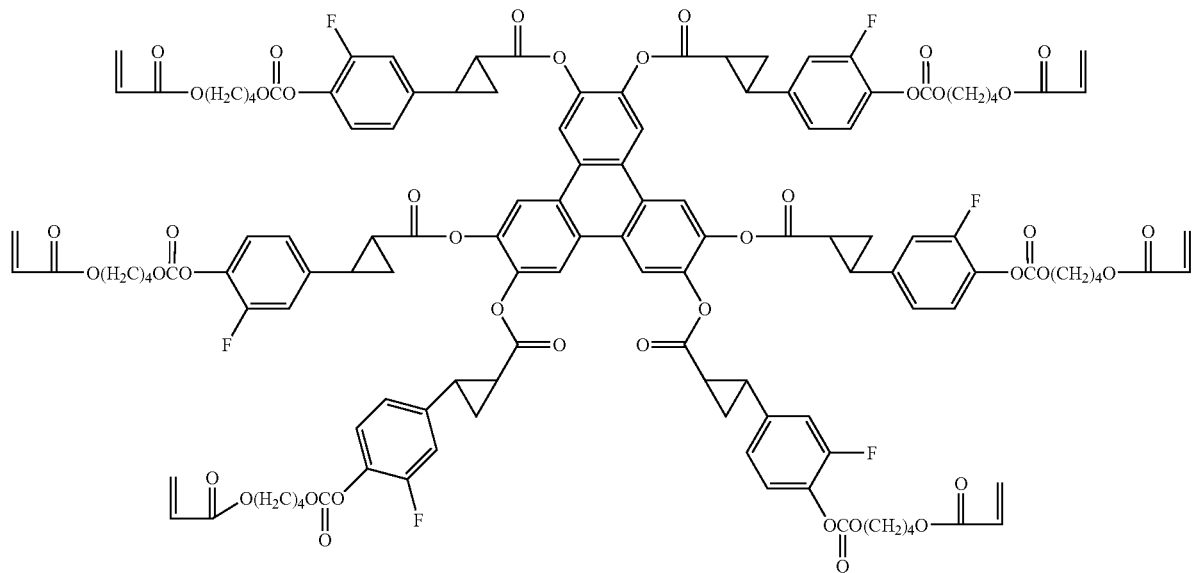
(75)
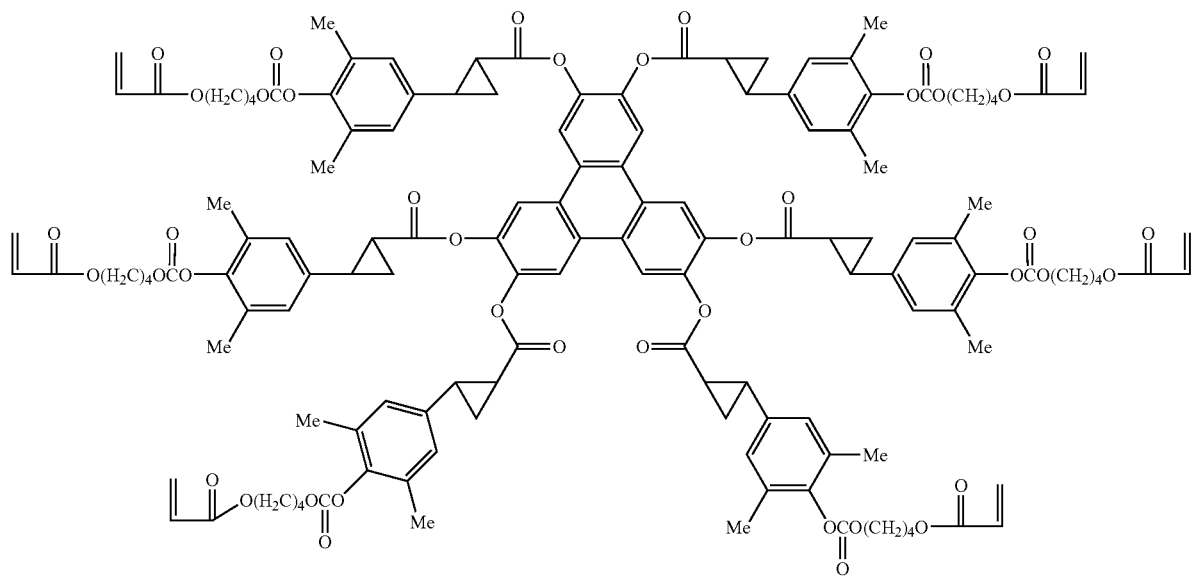

-continued

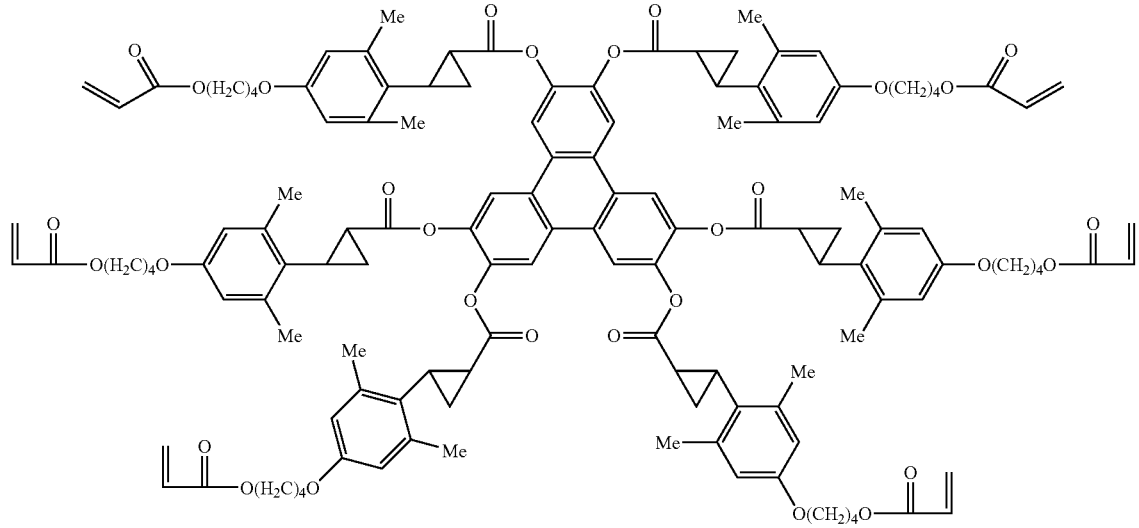

(76)

The discotic compound disclosed in the present invention may exhibit liquid crystallinity by itself or as a result of mixture with another liquid crystal. In the case of using the compound of the present invention by mixing it with another discotic liquid crystalline, the ratio of the discotic compound according to the present invention to the entire liquid crystalline molecule is preferably from 1 to 100 mass %, more preferably from 10 to 98 mass %, and most preferably from 30 to 95 mass %.

[Optically Anisotropic Layer]

The optically anisotropic material where the discotic compound represented by formula (I) is aligned can be used as an optically anisotropic layer of a retardation plate (or optical compensatory sheet). The optically anisotropic layer exhibits optical anisotropy based on the alignment of discotic compound.

The optically anisotropic layer may be formed of a composition containing the discotic compound of the present invention and additionally containing other materials such as a material contributing to the control of alignment of the discotic compound and a material contributing to the fixing of aligned state. When the discotic compound according to the present invention is once heated to a liquid phase-forming temperature and then cooled while maintaining the aligned state, the discotic compound can be fixed without impairing the alignment mode in the liquid crystal state. The discotic compound according to the present invention can also be fixed by heating a composition having added thereto a polymerization initiator to a liquid crystal phase-forming temperature and after polymerization, cooling it. The "aligned state which is fixed" as used in the present invention is not limited to a state where the alignment is maintained, though this is a most typical and preferred embodiment, and means a state where the layer has no fluidity and the fixed alignment mode can be stably maintained without causing change in the alignment mode due to external field or outer force.

Incidentally, when the aligned state is finally fixed, the liquid crystal composition need not exhibit liquid crystallinity any more. For example, when a polmerizable compound used as the liquid crystal compound, the polymerizable compound may result in having a high molecular weight and losing the liquid crystallinity as the polymerization or crosslinking reaction proceeds due to a reaction by heat, light or the like.

[Retardation Plate]

A retardation plate having an optically anisotropic layer formed of a discotic compound can be produced by using the above-described discotic compound. That is, the discotic compound according to the present invention can be used as a raw material of the optically anisotropic layer. For example, in the case of producing an optically anisotropic layer by using the compound having a polymerizable group of the present invention, the compound is polymerized alone or with another compound in the process of production and an optically anisotropic layer containing a polymer using the compound of the present invention as a polymerization unit is finally produced. Such an optically anisotropic layer is also included in the scope of the present invention.

In one embodiment, the retardation plate comprises a transparent support and an optically anisotropic layer formed of the discotic compound according to the present invention. In this case, the optically anisotropic layer can be produced by coating a composition containing the discotic compound of the present invention and, if desired, other additives on an orientation film, and fixing the aligned state reflecting the liquid crystal state as described above. After the aligned state of liquid crystalline molecules is fixed on the orientation film, the coating film may be transferred to another support. The liquid crystal compound fixed in its aligned state can maintain the aligned state even without the orientation film. Accordingly, the retardation plate may not have an orientation film. The thickness of the optically anisotropic layer is preferably from 0.1 to 20 μm, more preferably from 0.2 to 15 μm, and most preferably from 0.5 to 10 μm.

[Additives of Optically Anisotropic Layer]

Examples of the additive which can be added to the discotic compound in the formation of optically anisotropic layer include an air interface alignment controlling agent, an anti-shedding agent, a polymerization initiator and a polymerizable monomer.

[Air Interface Alignment Controlling Agent]

At the air interface, the liquid crystal compound is aligned at a pretilt angle of the air interface. This pretilt angle includes three kinds of pretilt angles, that is, a pretilt angle made by the nx refractive index direction and the air interface, a pretilt angle made by the ny refractive index direction and the air interface, and a pretilt angle made by the nz refractive index direction and the air interface. The degree of this pretilt angle varies depending on the kind of the compound and therefore, the pretilt angle at the air interface must be freely controlled according to the purpose.

This pretilt angle may be controlled by using an external field such as electric field or magnetic field or by using an additive but is preferably controlled by using an additive.

The additive is preferably a compound containing, within the molecule, one or more, more preferably two or more, substituted or unsubstituted aliphatic group(s) having from 6 to 40 carbon atoms, or substituted or unsubstituted aliphatic substituted oligosiloxanoxy group(s) having from 6 to 40 carbon atoms. For example, a hydrophobic excluded volume effect compound described in JP-A-2002-20363 can be used as the air interface alignment controlling agent.

The amount added of the additive for controlling the alignment on the air interface side is preferably from 0.001 to 20 mass %, more preferably from 0.01 to 10 mass %, and most preferably from 0.1 to 5 mass %, based on the discotic compound.

[Anti-Shedding Agent]

In general, a polymer compound can be suitably used as the material added to the discotic compound for preventing the shedding at the coating of the composition. The polymer used is not particularly limited as long as it does not seriously change the tilting angle or inhibit the alignment of the discotic compound.

Examples of the polymer include those described in JP-A-8-95030, and specific examples of particularly preferred polymers include cellulose esters. Examples of the cellulose ester include cellulose acetate, cellulose acetate propionate, hydroxypropylcellulose and cellulose acetate butyrate. In order not to inhibit the alignment of the discotic crystal, the amount added of the polymer used for preventing the shedding is generally from 0.1 to 10 mass %, preferably from 0.1 to 8 mass %, more preferably from 0.1 to 5 mass %, based on the discotic compound.

[Polymerization Initiator]

In the present invention, the liquid crystalline compound is preferably fixed in the monodomain alignment, that is, substantially uniform alignment. For this purpose, when a polymerizable discotic compound is used, the discotic compound is preferably fixed by the polymerization reaction The polymerization reaction includes a thermal polymerization reaction using a thermal polymerization initiator, a photopolymerization reaction using a photopolymerization initiator, and a polymerization reaction by the irradiation of an electron beam, but in order to prevent the support or the like from deformation or deterioration due to heat, a photopolymerization reaction and a polymerization reaction by the irradiation of an electron beam are preferred. Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimer and p-aminophenyl ketone (described in U.S. Pat. No. 3,549,367), acridine and phenazine compounds (described in JP-A-60-105667 and U.S. Pat. No. 4,239,850), and oxadiazole compounds (described in U.S. Pat. No. 4,212,970). The amount of the photopolymerization initiator used is preferably from 0.01 to 20 mass %, more preferably from 0.5 to 5 mass %, based on the solid content of the coating solution. The light irradiation for the polymerization of discotic compound is preferably performed by using an ultraviolet ray. The irradiation energy is preferably from 10 mJ/m$^2$ to 50 J/cm$^2$, more preferably from 50 to 800 mJ/cm$^2$. In order to accelerate the photopolymerization reaction, the light irradiation may be performed under heating. The oxygen concentration in the atmosphere participates in the polymerization degree and therefore, when a desired polymerization degree is not achieved in air, the oxygen concentration is preferably decreased by nitrogen purging or the like. The oxygen concentration is preferably 10% or less, more preferably 7% or less, and most preferably 3% or less.

[Polymerizable Monomer]

In the liquid crystal composition used for forming the optically anisotropic layer, a polymerizable monomer may be added. The polymerizable monomer used together with the liquid crystalline compound is not particularly limited as long as it has compatibility with the liquid crystalline compound and does not seriously change the tilting angle or inhibit the alignment of the liquid crystalline compound. Among these polymerizable monomers, preferred are compounds having a polymerization-active ethylenically unsaturated group such as vinyl group, vinyloxy group, acryloyl group and methacrylcyl group. The amount of the polymerizable monomer added is generally from 0.5 to 50 mass %, preferably from 1 to 30 mass %, based on the liquid crystalline compound. Also, when a monomer having two or more reactive functional groups is used, an effect of enhancing the adhesion between the orientation film and the optically anisotropic layer may be provided and therefore, this is particularly preferred.

[Coating Solvent]

The solvent used for the preparation of the liquid crystal composition is preferably an organic solvent. Examples of the organic solvent include amides (e.g., N,N-dimethylformamide), sulfoxides (e.g., dimethylsulfoxide), heterocyclic compounds (e.g., pyridine), hydrocarbons (e.g., toluene, hexane), alkyl halides (e.g., chloroform, dichloromethane), esters (e.g., methyl acetate, butyl acetate), ketones (e.g., acetone, methyl ethyl ketone, methyl isobutyl ketone, cyclohexanone) and ethers (e.g., tetrahydrofuran, 1,2-dimethoxyethane). Among these, alkyl halides, esters and ketones are preferred. Two or more organic solvents may be used in combination.

[Coating Method]

The optically anisotropic layer is formed by preparing a coating solution of the liquid crystal composition with use of the above-described solvent and then coating the solution on an orientation film to align the discotic compound. The coating solution can be coated by a known method (e.g., wire bar coating, extrusion coating, direct gravure coating, reverse gravure coating, die coating).

[Orientation Film]

The orientation film can be provided by a method such as rubbing of an organic compound (preferably, a polymer), oblique vapor deposition of an inorganic compound, formation of a layer having microgrooves, or accumulation of an organic compound (e.g., (ω-tricosanoic acid, methyl stearate) according to a Langmuir-Blodgett (LB film) method. Furthermore, an orientation film capable of exerting an aligning function upon application of an electric or magnetic field or irradiation with light is also known.

The orientation film may be any layer as long as it can impart a desired alignment to the discotic compound of the optically anisotropic layer provided on the orientation film, but in the present invention, the orientation film is preferably formed by rubbing or irradiation with light, more preferably by rubbing a polymer. The rubbing can be generally performed by rubbing the polymer layer surface with paper or cloth several times in a constant direction, but in the present invention, the rubbing is preferably performed by the method described in *Ekisho Binran (Handbook of Liquid Crystal)*, Maruz en. The thickness of the orientation film is preferably from 0.01 to 10 μm, more preferably from 0.05 to 3 μm.

Incidentally, after a rod-like liquid crystalline compound is aligned by using an orientation film and the rod-like liquid crystalline compound is fixed in the as-aligned state to form an optically anisotropic layer, only the optically anisotropic layer may be transferred onto a polymer film (or a transparent support). The rod-like liquid crystalline compound fixed in its aligned state can maintain the aligned state even without the orientation film. Accordingly, the orientation film is not essential for the retardation plate (though essential in the production of the retardation plate).

For aligning the discotic compound, a polymer (usually a polymer for alignment) of adjusting the surface energy of the orientation film is used. Specific kinds of the polymer are described in various publications regarding a liquid crystal cell or an optical compensatory sheet. Any orientation film preferably has a polymerizable group for the purpose of improving the adhesion between the discotic compound and the transparent support. The polymerizable group may be introduced by introducing a repeating unit having a polymerizable group on the side chain or may be introduced as a substituent of a cyclic group. An orientation film of forming a chemical bond with the liquid crystalline compound at the interface is preferred, and such an orientation film is described in JP-A-9-152509.

[Rubbing Density of Orientation Film]

The rubbing density of the orientation film and the pretilt angle of the discotic compound at the interface with the orientation film have a relationship such that as the rubbing density is increased, the pretilt angle becomes small, whereas as the rubbing density is decreased, the pretilt angle becomes large. Therefore, the pretilt angle can be adjusted by varying the rubbing density of the orientation film. The rubbing density of the orientation film can be varied by the method described in *Ekisho Binran (Handbook of Liquid Crystal)*, edited by Ekisho Binran Henshu Iinkai, Maruzen (2000). More specifically, the rubbing density (L) is quantified by formula (A):

$$L = Nl\{1+(2\pi rn/60v)\} \quad \text{Formula (A)}$$

wherein N is the number of rubbings, l is the contact length of the rubbing roller, r is the radius of the roller, n is the rotation number (rpm) of the roller, and v is the stage moving speed (per second). The rubbing density may be elevated by increasing the number of rubbings, the contact length of the rubbing roller, the radius of the roller or the rotation number of the roller or by decreasing the stage moving speed. On the other hand, the rubbing density may be lowered by reversing the increase or decrease of these factors.

[Transparent Support]

The retardation plate may have a support, and the support is preferably a transparent support. The material for the support is not particularly limited as long as it mainly exhibits optical isotropy and ensures a light transmittance of 80% or more, but a polymer film is preferred. Specific examples of the polymer include cellulose esters (e.g., cellulose diacetate, cellulose triacetate), norbornene-based polymers and poly (meth)acrylate esters, and a film thereof is used. Many commercially available polymers can be suitably used. Among these, in view of the optical performance, cellulose esters are preferred, and lower fatty acid esters of cellulose are more preferred. The lower fatty acid means a fatty acid having 6 or less carbon atoms, and the number of carbon atoms is preferably 2, 3 or 4. Specific examples thereof include cellulose acetate, cellulose propionate and cellulose butyrate. Among these, cellulose triacetate is more preferred. A mixed fatty acid ester such as cellulose acetate propionate and cellulose acetate butyrate may also be used. Furthermore, even in the case of conventionally known polymers of readily expressing birefringence, such as polycarbonate and polysulfone, those reduced in this expression by modifying the molecule, described in International Publication No. WO00/26705, can be used.

The cellulose ester which is preferably used as the transparent support is described in detail below.

The cellulose ester is preferably a cellulose acetate having an acetylation degree of 55.0 to 62.5%, more preferably from 57.0 to 62.0%. The acetylation degree means the amount of acetic acid bonded per unit mass of cellulose. The acetylation degree is determined according to the Measurement and Calculation of Acetylation Degree described in ASTM: D-817-91 (Test Method of Cellulose Acetate, etc.). The viscosity average polymerization degree (DP) of cellulose ester is preferably 250 or more, more preferably 290 or more. The cellulose ester for use in the present invention preferably has a narrow molecular weight distribution Mw/Mn (Mw is a mass average molecular weight, and Mn is a number average molecular weight) as measured by gel permeation chromatography. Specifically, the Mw/Mn value is preferably from 1.0 to 1.7, more preferably from 1.3 to 1.65, and most preferably from 1.4 to 1.6.

In the cellulose triacetate, the hydroxyl groups at the 2-, 3- and 6-positions of cellulose are not evenly distributed in ⅓ portions of the entire substitution degree, but the substitution degree of hydroxyl group at the 6-position tends to be small. The substitution degree of hydroxyl group at the 6-position of cellulose is preferably larger than those at the 2- and 3-positions. The hydroxyl group at the 6-position, which is substituted by an acyl group, preferably accounts for 30 to 40%, more preferably 31% or more, still more preferably 32% or more, of the entire substitution degree. The substitution degree at the 6-position is preferably 0.88 or more. The hydroxyl group at the 6-position may be substituted by an acyl group having 3 or more carbon atoms (e.g., propionyl, butyryl, valeroyl, benzoyl, acryloyl) other than an acetyl group. The substitution degree at each position can be determined by NMR. Cellulose esters having a high substitution degree of hydroxyl group at the 6-position can be synthesized by referring to the methods described in JP-A-11-5851, that is, Synthesis Example 1 (paragraphs 0043 to 0044), Synthesis Example 2 (paragraphs 0048 to 0049) and Synthesis Example 3 (paragraphs 0051 to 0052).

In the polymer film used as the transparent support, particularly in the cellulose acetate film, an aromatic compound having at least two aromatic rings may be used as a retardation increasing agent so as to adjust the retardation value. In the case of using such a retardation increasing agent, the retardation increasing agent is used in an amount of 0.01 to 20 parts by mass, preferably from 0.05 to 15 parts by mass, more preferably from 0.1 to 10 parts by mass, per 100 parts by mass of the cellulose acetate. Two or more aromatic compounds may be used in combination. The aromatic ring of the aromatic compound includes an aromatic hydrocarbon ring and an aromatic heterocyclic ring.

The aromatic hydrocarbon ring is preferably a 6-membered ring (namely, benzene ring). The aromatic heterocyclic ring is generally an unsaturated heterocyclic ring. The aromatic heterocyclic ring is preferably a 5-, 6- or 7-membered ring, more preferably a 5- or 6-membered ring. The aromatic heterocyclic ring generally has a largest number of double bonds. The heteroatom is preferably a nitrogen atom, an oxygen atom or a sulfur atom, more preferably a nitrogen atom. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. The aromatic ring is preferably a benzene ring, a furan ring, a thiophene ring, a pyrrole ring, an oxazole ring, a thiazole ring, an imidazole ring, a triazole ring, a pyridine ring, a pyrimidine ring, a pyrazine ring or a 1,3,5-triazine ring, more preferably a benzene ring or a 1,3,5-triazine ring. The aromatic compound preferably contains at least one 1,3,5-triazine ring.

The number of aromatic rings in the aromatic compound is preferably from 2 to 20, more preferably from 2 to 12, still more preferably from 2 to 8, and most preferably from 2 to 6. The bonding relationship of two aromatic rings can be classified into (a) a case where two aromatic rings form a condensed ring, (b) a case where two aromatic rings are directly bonded by a single bond, and (c) a case where two aromatic rings are bonded through a linking group (a spiro bond cannot be formed because the rings are an aromatic ring). The bonding relationship may be any one of (a) to (c). Such a retardation increasing agent is described, for example, in International Publication Nos. WO01/88574 (pamphlet) and WO00/2619 (pamphlet), JP-A-2000-111914, JP-A-2000-275434 and Japanese Patent Application No. 2002-70009.

The cellulose acetate film is preferably produced from a prepared cellulose acetate solution (dope) by a solvent casting method. In the dope, the above-described retardation increasing agent may be added. The dope is cast on a drum or a band, and the solvent is evaporated to form a film. The concentration of the dope before casting is preferably adjusted to give a solid content of 18 to 35%. The surface of the drum or band is preferably finished to provide a mirror state. The casting and drying methods in the solvent casting method are described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 (the term "JP-B" as used herein means an "examined Japanese patent publication"), JP-B-49-5614, JP-A-60-176834, JP-A-60-203430 and JP-A-62-115035. The dope is preferably cast on a drum or band having a surface temperature of 10° C. or less. After the casting, the dope is preferably dried with air for 2 seconds or more. The obtained film is peeled off from the drum or band, and the film may be further dried with hot air by sequentially varying the temperature from 100° C. to 160° C. to remove the residual solvent. This method is described in JP-B-5-17844. According to this method, the time from casting until peeling can be shortened. For practicing this method, it is necessary that the dope is gelled at the surface temperature of the drum or band on casting.

The dope is prepared by dissolving raw material flakes in a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether). A representative example of the solvent for dissolving the cellulose acylate is dichloromethane, but in view of global environment or working environment, the solvent preferably contains substantially no halogenated hydrocarbon such as dichloromethane. The term "contain substantially no halogenated hydrocarbon" as used herein means that the percentage of halogenated hydrocarbon in the organic solvent is less than 5 mass % (preferably less than 2 mass %). The cellulose acylate film containing substantially no halogenated hydrocarbon such as dichloromethane, and the production method thereof are described in detail in JIII Journal of Technical Disclosure, No. 2001-1745 issued on Mar. 15, 2001 (hereinafter simply referred to as "Technical Disclosure No. 2001-1745").

Using the prepared cellulose acetate solution (dope), dopes of two or more layers may also be cast to form a film. The dope is cast on a drum or a band and the solvent is evaporated to form a film. The concentration of the dope before casting is preferably adjusted to give a solid content of 10 to 40%. The surface of the drum or band is preferably finished to provide a mirror state. In the case of casting a plurality of cellulose acetate solutions, a film may be produced by casting respective cellulose acetate-containing solutions from a plurality of casting ports provided with spacing in the traveling direction of support and thereby stacking the layers. For example, the methods described in JP-A-61-158414, JP-A-1-122419 and JP-A-11-198285 can be used. Furthermore, a film may be produced by casting cellulose acetate solutions from two casting ports and for example, the methods described in JP-B-60-27562, JP-A-61-94724, JP-A-61-947245, JP-A-61-104813, JP-A-61-158413 and JP-A-6-134933 can be used. In addition, a method for casting cellulose acetate film described in JP-A-56-162617 may also be used, where a flow of high-viscosity cellulose acetate solution is wrapped with a low-viscosity cellulose acetate solution and the high-viscosity and low-viscosity cellulose acetate solutions are simultaneously extruded.

The cellulose acetate film may be further stretched to adjust the retardation value. The stretching percentage is preferably from 0 to 100%. In the case of stretching the cellulose acetate film for use in the present invention, tenter stretching is preferably used and in order to control the slow axis with high precision, the difference, for example, in the speed between right and left tenter clips or in the timing of disengagement is preferably reduced as small as possible.

In the cellulose ester film, a plasticizer may be added so as to improve the mechanical properties or increase the drying speed. As the plasticizer, a phosphoric acid ester or a carboxylic acid ester is used. Examples of the phosphoric acid ester include triphenyl phosphate (TPP) and tricresyl phosphate (TCP). The carboxylic acid ester is represented by a phthalic acid ester and a citric acid ester. Examples of the phthalic acid ester include dimethyl phthalate (DMP), diethyl phthalate (DEP), dibutyl phthalate (DBP), dioctyl phthalate (DOP), diphenyl phthalate (DPP) and di-2-ethylhexyl phthalate (DEHP) Examples of the citric acid ester include triethyl O-acetylcitrate (OACTE) and tributyl O-acetylcitrate (OACTB). Other examples of the carboxylic acid ester include butyl oleate, methylacetyl ricinoleate, dibutyl sebacate and various trimellitic acid esters. Among these, phthalic ester-based plasticizers (DMP, DEP, DBP, DOP, DPP, DEHP) are preferred, and DEP and DPP are more preferred. The amount of the plasticizer added is preferably from 0.1 to 25 mass %, more preferably from 1 to 20 mass %, and most preferably 3 to 15 mass %, based on the amount of cellulose ester.

In the cellulose ester film, a deterioration inhibitor (e.g., antioxidant, peroxide decomposer, radical inhibitor, metal inactivating agent, oxygen scavenger, amines) or an ultraviolet inhibitor may be added. The deterioration inhibitor is described in JP-A-3-199201, JP-A-5-1907073, JP-A-5-194789, JP-A-5-271471 and JP-A-6-107854. The amount of the deterioration inhibitor added is preferably from 0.01 to 1 mass %, more preferably from 0.01 to 0.2 mass %, based on the solution (dope) prepared. If the amount added is less than 0.01 mass %, the effect of deterioration inhibitor can be hardly obtained, whereas if the amount added exceeds 1 mass %, the deterioration inhibitor sometimes bleeds out onto the film surface. Examples of particularly preferred deterioration inhibitors include butyrated hydroxytoluene (BHT). The ultraviolet inhibitor is described in JP-A-7-11056.

The cellulose acetate film is preferably subjected to a surface treatment. Specific examples of the surface treatment include a corona discharge treatment, a glow discharge treatment, a flame treatment, an acid treatment, an alkali treatment and an ultraviolet irradiation treatment. It is also preferred to provide an undercoat layer as described in JP-A-7-333433. In these treatments, from the standpoint of keeping the planarity of film, the temperature of cellulose acetate film is preferably set to Tg (glass transition temperature) or less, specifically, 150° C. or less.

In view of adhesion to the orientation film or the like, the surface treatment of cellulose acetate film is preferably an acid treatment or an alkali treatment, namely, a saponification treatment for cellulose acetate.

The surface treatment is described in detail below by referring to the alkali saponification treatment as an example.

The alkali saponification treatment is preferably performed by a cycle such that the film surface is dipped in an alkali solution, neutralized with an acidic solution, washed with water and dried. Examples of the alkali solution include a potassium hydroxide solution and a sodium hydroxide solution. The normality of hydroxide ion is preferably from 0.1 to 3.0 mol/L, more preferably from 0.5 to 2.0 mol/L. The temperature of alkali solution is preferably from room temperature to 90° C., more preferably from 40 to 70° C.

The surface energy of cellulose acetate film is preferably 55 mN/m or more, more preferably from 60 to 75 mN/m.

The thickness of the cellulose acetate film is usually from 5 to 500 μm, preferably from 20 to 250 μm, more preferably from 30 to 180 μm, still more preferably from 30 to 110 μm.

The retardation plate can be used for an elliptically polarizing plate by combining it with a polarizing film. Furthermore, when applied in combination with a polarizing plate to a transmission-type, reflection-type or transflective liquid crystal display device, the retardation plate contributes to the enlargement of viewing angle. The elliptically polarizing plate and liquid crystal display device using the retardation plate are described below.

[Elliptically Polarizing Plate]

An elliptically polarizing plate can be produced by stacking a retardation plate and a polarizing film. By the use of the retardation plate, an elliptically polarizing plate capable of enlarging the viewing angle of a liquid crystal display device can be provided. The polarizing film includes an iodine-type polarizing film, a dye-type polarizing film using a dichroic dye, and a polyene-type polarizing film. The iodine-type polarizing film and dye-type polarizing film are generally produced by using a polyvinyl alcohol-based film. The polarization axis of the polarizing film corresponds to the direction perpendicular to the stretching direction of the film.

The polarizing film is stacked on the optically anisotropic layer side of the retardation plate. On the surface of the polarizing film opposite the side where the optically anisotropic layer is stacked, a transparent protective film is preferably formed. The transparent protective film preferably has a light transmittance of 80% or more. For the transparent protective film, a cellulose ester film is generally used, and a triacetyl cellulose film is preferred. The cellulose ester film is preferably formed by a solvent casting method. The thickness of the transparent protective film is preferably from 20 to 500 μm, more preferably from 50 to 200 μm.

[Liquid Crystal Display Device]

By the use of the retardation plate using the discotic compound of the present invention, a liquid crystal display device enlarged in the viewing angle can be provided. The liquid crystal display device usually comprises a liquid crystal cell, a polarizing element and a retardation plate (optical compensatory sheet). The polarizing element generally comprises a polarizing film and a protective film. As for the polarizing film and protective film, those described above regarding the elliptically polarizing plate can be used. The retardation plate (optical compensatory sheet) for TN-mode liquid crystal cells is described in JP-A-6-214116, U.S. Pat. Nos. 5,583,679 and 5,646,703 and German Patent Publication No. 3911620A1. The optical compensatory sheet for IPS-mode or FLC-mode liquid crystal cells is described in JP-A-10-54982, the optical compensatory sheet for OCB-mode or HAN-mode liquid crystal cells is described in U.S. Pat. No. 5,805,253 and International Publication No. WO96/37804, the optical compensatory sheet for STN-mode liquid crystal cells is described in JP-A-9-26572, and the optical compensatory sheet for VA-mode liquid crystal cells is described in Japanese Patent 2,866,372.

In the present invention, the retardation plate (optical compensatory sheet) for liquid crystal cells in various modes can be produced by referring to these patent publications. The retardation plate can be used for liquid crystal display devices in various display modes such as TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and HAN (hybrid aligned nematic) mode. The retardation plate is particularly effective for the optical compensation of liquid crystal display devices in the TN (twisted nematic) and OCB (optically compensatory bend) modes.

EXAMPLES

The present invention is described in greater detail below by referring to Examples. The materials, amounts used, ratios, and contents and procedures of processing employed in the following Examples can be appropriately modified as long as the purport of the present invention is observed. Accordingly, the present invention is not limited to these specific Examples.

The discotic compound represented by formula (I) can be synthesized according to the following Synthesis Examples.

Synthesis Example 1

Compound (1) was synthesized by the following route. The phase transition temperature is a measured value by the observation through a polarizing microscope (the same applies to Synthesis Example 2 and others in the following).

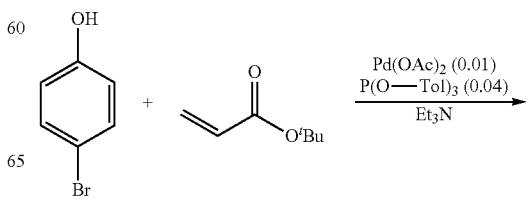

-continued

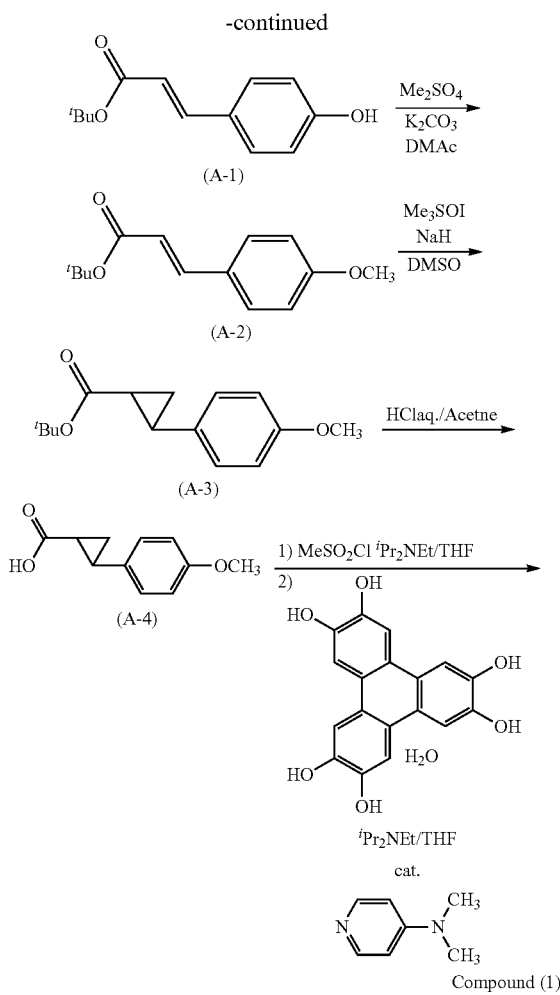

In a nitrogen atmosphere, palladium acetate (0.42 g, 1.87 mmol) and tri(o-tolyl)phosphine (2.28 g, 7.49 mmol) were added to a triethylamine (200 ml) solution containing 4-bromophenol (32.3 g, 187 mmol) and tert-butyl acrylate (34 ml, 234 mmol), and the resulting solution was stirred at 90° C. for 4 hours. The obtained reaction solution was allowed to cool and after adding ethyl acetate and aqueous dilute hydrochloric acid, liquid-separated, and the organic phase was washed with aqueous dilute hydrochloric acid and saturated brine and then dried over anhydrous magnesium sulfate. Thereafter, the solvent was removed by distillation under reduced pressure, and the residue was purified by silica gel column chromatography using an ethyl acetate-hexane mixed solvent as the eluent to obtain 35.0 g (yield: 85%) of (A-1).

In a nitrogen atmosphere, potassium carbonate (27.6 g, 0.2 mol) was added to a dimethylacetamide (300 ml) solution containing (A-1) (22.0 g, 0.1 mol) and dimethylsulfuric acid (18.9 g, 0.15 mol), and the resulting solution was stirred at 100° C. for 5 hours. The obtained reaction solution was allowed to cool and after adding ethyl acetate and saturated brine, liquid-separated, and the organic phase was washed with aqueous dilute hydrochloric acid and saturated brine and then dried over anhydrous magnesium sulfate. Thereafter, the solvent was removed by distillation under reduced pressure, and the residue was purified by silica gel column chromatography using an ethyl acetate-hexane mixed solvent as the eluent to obtain 21.8 g (yield: 93%) of (A-2).

In a nitrogen atmosphere, dimethylsulfoxide (70 ml) was added dropwise to sodium hydride (1.2 g, 50 mmol) and trimethylsulfonium iodide (11.0 g, 50 mmol). After confirming that hydrogen was not generated any more, the solution was further stirred for 30 minutes and thereto, a dimethylsulfoxide (10 ml) solution of (A-2) (9.0 g, 38.4 mmol) was added, followed by stirring at 50° C. for 3 hours. The obtained reaction solution was allowed to cool and after adding ethyl acetate and saturated brine, liquid-separated, and the organic phase was washed with aqueous dilute hydrochloric acid and saturated brine and then dried over anhydrous magnesium sulfate. Thereafter, the solvent was removed by distillation under reduced pressure to obtain 8.6 g of a crude product (A-3) (crude yield: 90%).

Subsequently, 30 ml of aqueous hydrochloric acid (36%) was added to an acetone (70 ml) solution of (A-3) (7.4 g, 30 mmol), and the resulting solution was refluxed for 1 hour. The obtained reaction solution was allowed to cool and after adding ethyl acetate and saturated brine, liquid-separated, and the organic phase was washed with saturated brine and then dried over anhydrous magnesium sulfate. Thereafter, the solvent was removed by distillation under reduced pressure, and the residue was crystallized from an ethyl acetate-hexane mixed solvent to obtain 5.1 g of (A-4) (yield: 88%).

In a nitrogen atmosphere, methanesulfonyl chloride (0.39 mlg, 5 mmol) was added under ice cooling to a tetrahydrofurane (20 ml) solution of (A-4) (1.3 g, 5 mmol) and thereto, ethyldiisopropylamine (0.87 ml, 5 mmol) was gradually added dropwise. After the completion of dropwise addition, the temperature was elevated to room temperature, and the resulting solution was stirred for 30 minutes. After confirming the reaction by a thin-layer chromatography (TLC), the reaction solution was ice-cooled, a tetrahydrofuran (20 ml) solution of 2,3,6,7,10,11-hexahydroxytriphenylene monohydrate (0.17 g, 0.5 mmol) was added thereto, and ethyldiisopropylamine (0.7 ml, 4 mmol) was further gradually added dropwise. After the completion of dropwise addition, a catalytic amount of N,N-dimethylaminopyridine was added and in this state, the temperature was elevated to room temperature, followed by stirring for 3 hours. Subsequently, methanol (150 ml) was passed and then, the solid content obtained by filtration was crystallized from an ethyl acetate-hexane mixed solvent to obtain 0.5 g (yield: 73%) of Compound (1).

$^1$H NMR (400 MHz, CDCl$_3$)

δ 1.30-1.45 (6H, m), 1.70-1.80 (6H, m), 2.05-2.15 (6H, m) 2.65-2.80 (6H, m), 3.80 (18H, s), 6.81 (12H, d, J=8.0 Hz), 7.01 (12H, d, J=8.0 Hz), 7.06 (12H, d, J=8.0 Hz), 8.22 (6H, s); mass spectrum (M+Na)/(POSI)=1392; phase transition temperature: Cry 100° C., Col 170° C., ND 235° C. Iso.

Synthesis Example 2

Compound (2) was synthesized at a yield of 43% (5 steps) in the same manner as in Synthesis Example 1 except for changing dimethylsulfuric acid in Synthesis Example 1 to bromobutane.

$^1$H NMR (400 MHz, CDCl$_3$)

δ 0.99 (6H, t, J=7.2 Hz), 1.30-1.65 (30, m), 1.70-1.95 (18H, m), 2.05-2.15 (6H, m), 2.65-2.80 (6H, m), 3.94 (12H, t, J=6.4 Hz), 6.80 (12H, d, J=8.0 Hz), 7.01 (12H, d, J=8.0 Hz), 7.04 (12H, d, J=8.0 Hz), 8.22 (6H, s); mass spectrum (M+Na)/(POSI)=1632; phase transition temperature: Cry 75° C., Col 100° C., ND 197-210° C. Iso.

Synthesis Example 3

Compound (3) was synthesized by the following route.

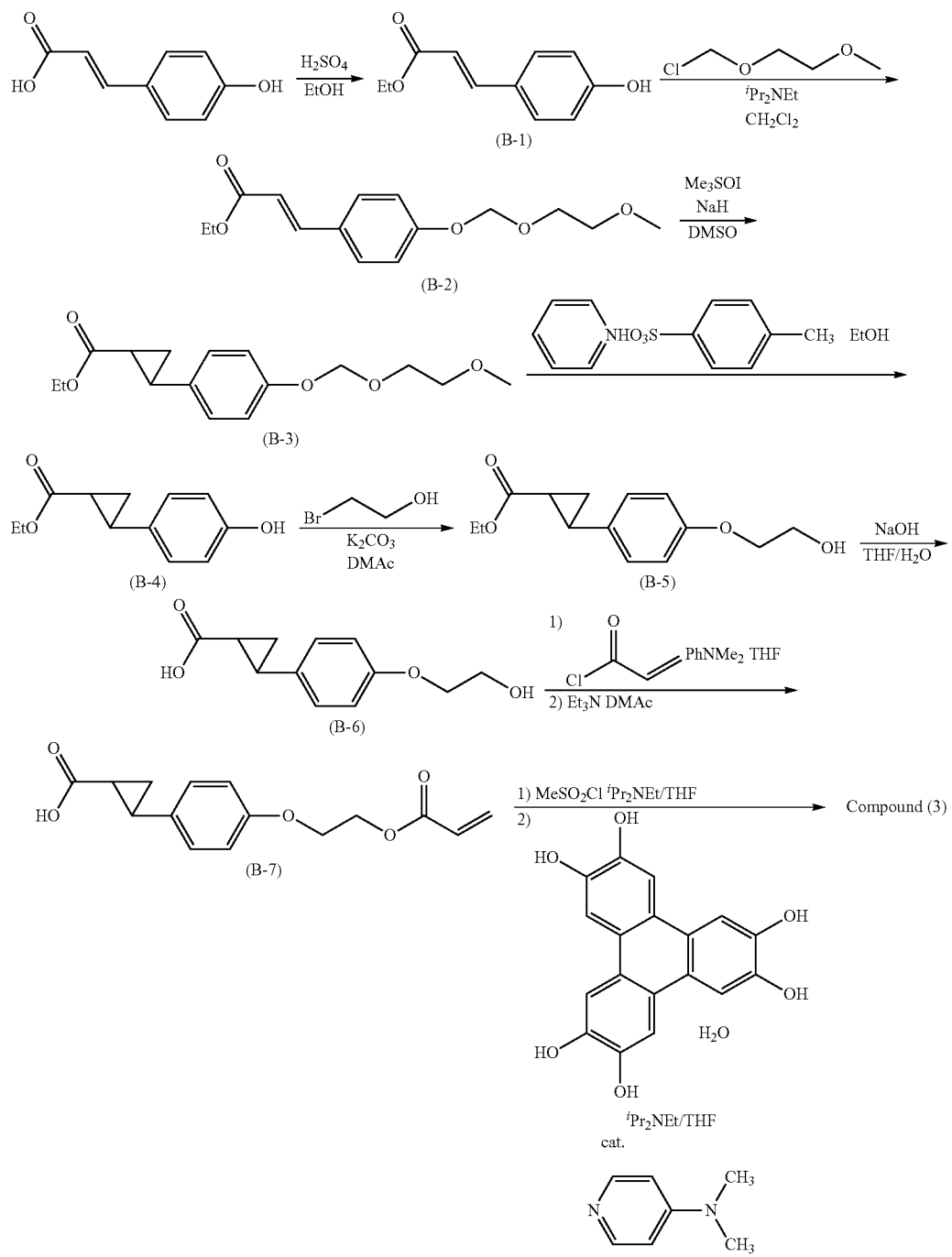

Concentrated sulfuric acid (20 ml) was added to an ethyl alcohol (1.5 L) solution of parahydroxycinnamic acid (200 g, 1.22 mol), and the resulting solution was refluxed for 6 hours. The obtained reaction solution was allowed to cool and after removing 1 L of ethyl alcohol by distillation under reduced pressure and adding ethyl acetate and saturated brine, liquid-separated, and the organic phase was neutralized with sodium bicarbonate water, washed with saturated brine and then dried over anhydrous magnesium sulfate. Thereafter, the solvent was removed by distillation under reduced pressure to obtain 226 g of (B-1) (yield: 97%).

Methoxyethoxymethyl chloride (MEMCl) (51.4 ml) was added to a methylene chloride (600 ml) solution of (B-1) (57.6 g, 0.3 mol) and then, diethylisopropylamine (78.4 ml, 0.45 mmol) was gradually added dropwise while keeping the temperature of the reaction system at 30° C. or less. In this state, the resulting solution was stirred for 3 hours and after adding saturated brine, liquid-separated, and the organic phase was washed with aqueous dilute hydrochloric acid and saturated brine and then dried over anhydrous magnesium sulfate. Thereafter, the solvent was removed by distillation under reduced pressure to obtain 77.4 g of (B-2) (yield: 92%).

In a nitrogen atmosphere, dimethylsulfoxide (160 ml) was added dropwise to sodium hydride (9.2 g, 228 mmol) and trimethylsulfonium iodide (50.2 g, 228 mmol). After confirming that hydrogen was not generated any more, the solution was further stirred for 30 minutes and thereto, a dimethylsulfoxide (600 ml) solution of (B-2) (49.2 g, 175.6 mmol) was added, followed by stirring at 50° C. for 3 hours. The obtained reaction solution was allowed to cool and after adding ethyl acetate and saturated brine, liquid-separated, and the organic phase was washed with aqueous dilute hydrochloric acid and saturated brine and then dried over anhydrous magnesium sulfate. Thereafter, the solvent was removed by distillation under reduced pressure to obtain 33.6 g of a crude product (B-3) (crude yield: 65%).

Subsequently, pyridinium p-toluenesulfonic acid (17.4 g, 69.3 mmol) was added to an ethanol (200 ml) solution of (B-3) (20.4 g, 69.3 mmol), and the resulting solution was refluxed for 1 hour and then stirred for 6 hours. The obtained reaction solution was allowed to cool and after adding ethyl acetate and saturated brine, liquid-separated, and the organic phase was washed with aqueous dilute hydrochloric acid and saturated brine and then dried over anhydrous magnesium sulfate. Thereafter, the solvent was removed by distillation under reduced pressure, and the residue was purified by silica gel column chromatography using an ethyl acetate-hexane mixed solvent as the eluent to obtain 13.0 g (yield: 91%) of (B-4).

In a nitrogen atmosphere, bromoethanol (11.2 g, 90 mmol) and potassium carbonate (12.4 g, 90 mmol) were added to an N,N'-dimethylacetamide (150 ml) solution of (B-4) (12.4 g, 60 mmol), and the resulting solution was stirred for 5 hours at an inner temperature of 110° C. The obtained reaction solution was allowed to cool and after adding ethyl acetate and saturated brine, liquid-separated, and the organic phase was washed with aqueous dilute hydrochloric acid and saturated brine and then dried over anhydrous magnesium sulfate. Thereafter, the solvent was removed by distillation under reduced pressure, and the residue was purified by silica gel column chromatography using an ethyl acetate-hexane mixed solvent as the eluent to obtain 14.0 g (yield: 93%) of (B-5).

An aqueous solution prepared by dissolving lithium hydroxide monohydrate (4.2 g, 100 mmol) in 100 ml of water was added to a tetrahydrofuran (100 ml) solution of (B-5) (14.0 g, 55.5 mmol), and the resulting solution was stirred under reflux for 6 hours. The obtained reaction solution was allowed to cool and after adding ethyl acetate and saturated brine, liquid-separated, and the organic phase was washed with aqueous dilute hydrochloric acid and saturated brine and then dried over anhydrous magnesium sulfate. Thereafter, the solvent was removed by distillation under reduced pressure, and the residue was purified by silica gel column chromatography using an ethyl acetate-hexane mixed solvent as the eluent to obtain 11.7 g (yield: 95%) of (B-6).

Subsequently, acrylic acid chloride (3.24 ml, 40 mmol), dimethylaniline (5.06 ml, 40 mmol) and nitrobenzene (0.3 ml) were added to a tetrahydrofuran (100 ml) solution of (B-6) (7.4 g, 33.2 mmol), and the resulting solution was stirred for 3 hours at an inner temperature of 60° C. The obtained reaction solution was allowed to cool and after adding ethyl acetate and saturated brine, liquid-separated, and the organic phase was washed with aqueous dilute hydrochloric acid and saturated brine and then dried over anhydrous magnesium sulfate. Thereafter, the solvent was removed by distillation under reduced pressure, and N,N'-dimethylacetamide (100 ml) and triethylamine (5.6 ml, 40 mmol) were added to the residue, followed by stirring for 2 hours at an inner temperature of 60° C. The obtained reaction solution was allowed to cool and after adding ethyl acetate and saturated brine, liquid-separated, and the organic phase was washed with aqueous dilute hydrochloric acid and saturated brine and then dried over anhydrous magnesium sulfate. Thereafter, the solvent was removed by distillation under reduced pressure, and the residue was crystallized from an ethyl acetate-hexane mixed solvent to obtain 7.2 g (yield: 78%) of (B-7).

In a nitrogen atmosphere, methanesulfonyl chloride (1.15 mlg, 14.8 mmol) was added under ice cooling to a tetrahydrofurane (100 ml) solution of (B-7) (4.1 g, 14.8 mmol) and thereto, diethylisopropylamine (2.58 ml, 14.8 mmol) was gradually added dropwise. After the completion of dropwise addition, the temperature was elevated to room temperature, and the resulting solution was stirred for 30 minutes. After confirming the reaction by TLC, the reaction solution was ice-cooled, a tetrahydrofuran (50 ml) solution of 2,3,6,7,10,11-hexahydroxytriphenylene monohydrate (0.63 g, 1.85 mmol) was added thereto, and diethylisopropylamine (2.13 ml, 12.25 mmol) was further gradually added dropwise. After the completion of dropwise addition, a catalytic amount of N,N-dimethylaminopyridine was added and in this state, the temperature was elevated to room temperature, followed by stirring for 3 hours. The obtained reaction solution was liquid-separated after adding ethyl acetate and saturated brine, and the organic phase was washed with aqueous dilute hydrochloric acid and saturated brine and then dried over anhydrous magnesium sulfate. Thereafter, the solvent was removed by distillation under reduced pressure, and the residue was purified by silica gel column chromatography using a dichloromethane-methanol mixed solvent as the eluent and then crystallized from ice-cooled methanol to obtain 2.8 g (yield: 82%) of Compound (3).

$^1$H NMR (400 MHz, CDCl$_3$)

δ 1.30-1.45 (6H, m), 1.70-1.85 (6H, m), 2.05-2.20 (6H, m), 2.65-2.80 (6H, m), 4.19 (12H, t, J=6.4 Hz), 4.52 (12H, t, J=6.4 Hz), 5.87 (6H, d, J=10.4 Hz), 6.17 (6H, d, d, J=10.4 Hz, 17.2 Hz), 6.46 (6H, d, J=17.2 Hz), 6.83 (12H, d, J=8.0 Hz), 7.03 (6H, d, J=8.0 Hz), 7.06 (6H, d, J=8.0 Hz), 8.24 (6H, s); mass spectrum (M+Na)/(POSI)=1896; phase transition temperature: Cry 70° C., ND 127° C. Iso.

Synthesis Examples 4 and 5

Compounds (4) and (5) were synthesized in the same manner as in Synthesis Example 3 except for changing the bromoethanol of Synthesis Example 3 to bromopropanol and bromobutanol, respectively. At this time, Compound (4) at a yield of 33% (8 steps) and Compound (5) at a yield of 24% (8 steps) were obtained.

Compound (4):

$^1$H NMR (400 MHz, CDCl$_3$)

δ 1.30-1.45 (6H, m), 1.70-1.85 (6H, m), 2.05-2.20 (18H, m), 2.65-2.80 (6H, m), 4.04 (12H, t, J=7.2 Hz), 4.37 (12H, t, J=6.4 Hz), 5.84 (6H, d, J=10.4 Hz), 6.13 (6H, d, d, J=10.4 Hz, 17.2 Hz), 6.42 (6H, d, J=17.2 Hz), 6.81 (12H, d, J=8.0 Hz), 7.01 (6H, d, J=8.0 Hz), 7.05 (6H, d, J=8.0 Hz), 8.19 (6H, s); mass spectrum (M+Na)/(POSI)=1980; phase transition temperature: Cry 65° C., ND 147° C. Iso.

Compound (5):

$^1$H NMR (400 MHz, CDCl$_3$)

δ 1.30-1.45 (6H, m), 1.70-1.85 (6H, m), 2.05-2.20 (30H, m), 2.65-2.80 (6H, m), 3.98 (12H, t, J=6.8 Hz), 4.25 (12H, t, J=6.4 Hz), 5.83 (6H, d, J=10.4 Hz), 6.13 (6H, d, d, J=10.4 Hz, J=6.4 Hz), 5.83 (6H, d, J=10.4 Hz), 6.13 (6H, d, d, J=10.4 Hz, 17.2 Hz), 6.42 (6H, d, J=17.2 Hz), 6.81 (12H, d, J=8.0 Hz), 7.02 (6H, d, J=8.0 Hz), 7.06 (6H, d, J=8.0 Hz), 8.21 (6H, s); mass spectrum (M+Na)/(POSI)=2064; phase transition temperature: Cry 70° C., ND 130° C. Iso.

Synthesis Example 6

Compound (17) was synthesized by the following route.

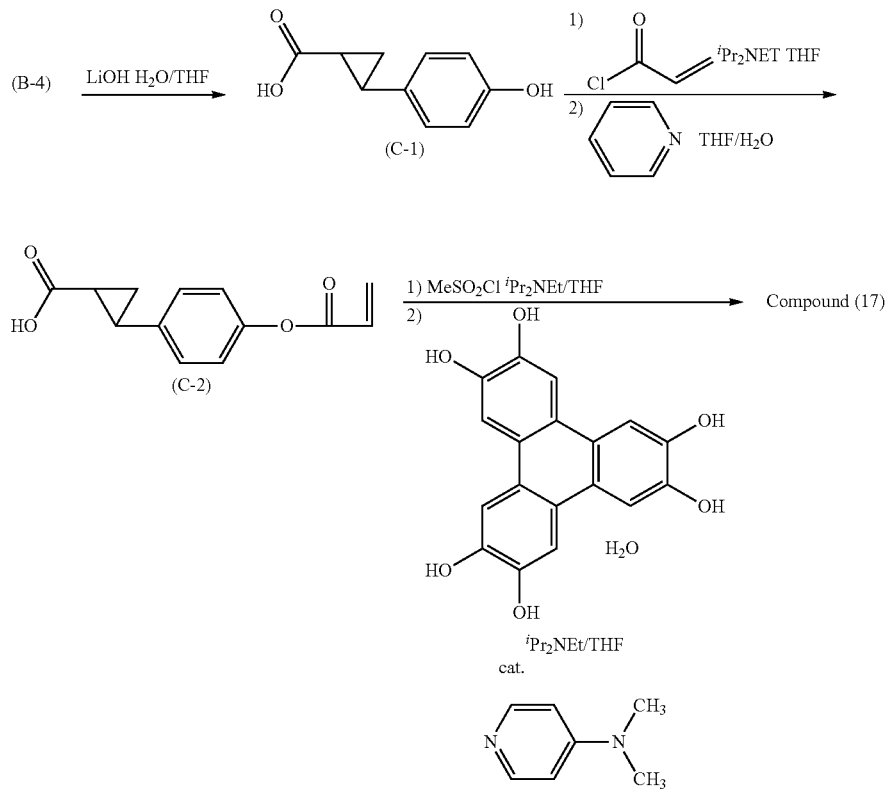

An aqueous 200 ml solution of lithium hydroxide monohydrate (21 g, 0.5 mol) was added to a tetrahydrofuran (200 ml) solution of (B-4) (20.6g, 0.1 mol) synthesized by the method of Synthesis Example 3, and the resulting solution was stirred under reflux for 5 hours. The obtained reaction solution was allowed to cool, neutralized by adding ethyl acetate and aqueous dilute hydrochloric acid and then liquid-separated, and the organic phase was washed with saturated brine and then dried over anhydrous magnesium sulfate. Thereafter, the solvent was removed by distillation under reduced pressure and then crystallized from an ethyl acetate-hexane mixed solvent to obtain 14.8 g (yield: 83%) of (C-1).

Subsequently, acrylic acid chloride (7.1 ml, 87 mmol) was added to a tetrahydrofuran (100 ml) solution of (C-1) (7.3 g, 41 mmol), and then dimethylisopropylamine (15.2 ml, 87 mmol) was gradually added dropwise at 0° C. After the completion of dropwise addition, the resulting solution was stirred for 1 hour and thereto, pyridine (10 ml) and water (10 ml) were added, followed by stirring for 1 hour at room temperature. The obtained reaction solution was liquid-separated after adding ethyl acetate and aqueous dilute hydrochloric acid, and the organic phase was washed with saturated brine and then dried over anhydrous magnesium sulfate. Thereafter, the solvent was removed by distillation under reduced pressure, and the residue was crystallized from an ethyl acetate-hexane mixed solvent to obtain 7.0 g (yield: 74%) of (C-2).

In a nitrogen atmosphere, methanesulfonyl chloride (0.77 mg, 10 mmol) was added under ice cooling to a tetrahydrofurane (40 ml) solution of (C-2) (2.32 g, 10 mmol) and thereto, diethylisopropylamine (1.74 ml, 10 mmol) was gradually added dropwise. After the completion of dropwise addition, the temperature was elevated to room temperature, and the resulting solution was stirred for 30 minutes. After confirming the reaction by TLC, the reaction solution was ice-cooled, a tetrahydrofuran (40 ml) solution of 2,3,6,7,10,11-hexahydroxytriphenylene monohydrate (0.43 g, 1.25 mmol) was added thereto, and ethyldiisopropylamine (1.52 ml, 8.75 mmol) was further gradually added dropwise. After the completion of dropwise addition, a catalytic amount of N,N-dimethylaminopyridine was added and in this state, the temperature was elevated to room temperature, followed by stirring for 3 hours. The obtained reaction solution was liquid-separated after adding ethyl acetate and saturated brine, and the organic phase was washed with aqueous dilute hydrochloric acid and saturated brine and then dried over anhydrous magnesium sulfate. Thereafter, the solvent was removed by distillation under reduced pressure, and the residue was purified by silica gel column chromatography using a dichloromethane-methanol mixed solvent as the eluent and then crystallized from ice-cooled methanol to obtain 1.6 g (yield: 81%) of Compound (17).

$^1$H NMR (400M Hz, CDCl$_3$)

δ 1.35-1.50 (6H, m), 1.70-1.90 (6H, m), 2.10-2.20 (6H, m) 2.70-2.85 (6H, m), 6.02 (6H, d, J=10.4 Hz), 6.33 (6H, d, d, J=10.4 Hz, 17.2 Hz), 6.61 (6H, d, J=17.2 Hz), 7.00-7.20 (24H, m), 8.21 (6H, s); mass spectrum (M+Na)/(POSI)= 1632; phase transition temperature: Cry 95° C., Col 114° C., ND 160° C. Iso.

Synthesis Example 7

Compound (18) was synthesized by the following route.

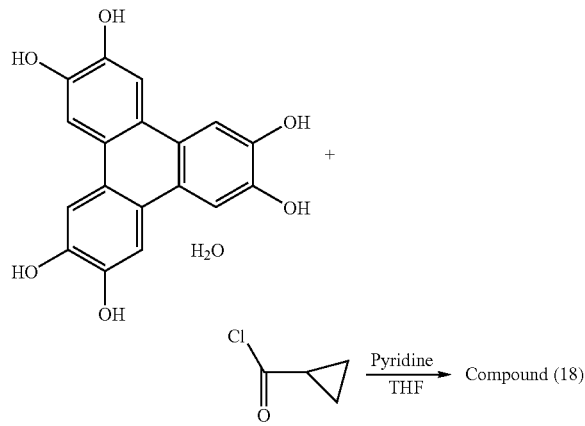

Cyclopropylcarbonyl chloride (4.5 ml, 50.0 mmol) was added to a tetrahydrofuran (200 ml) solution having dissolved therein 2,3,6,7,10,11-hexahydroxytriphenylene monohydrate (1.7 g, 5.0 mmol) and thereto, pyridine (15 ml) was gradually added dropwise under ice cooling. After the completion of the dropwise addition, the resulting solution was stirred at room temperature for 2 hours, and the obtained reaction solution was passed through methanol (500 ml). The solid content was taken out by filtration and crystallized from an ethyl acetate-hexane mixed solvent to obtain 3.3 g (yield: 90%) of Compound (18).

$^1$H NMR (400 MHz, CDCl$_3$)

δ 1.00-1.10 (12H, m), 1.20-1.30 (12H, m), 1.90-2.00 (6H, m), 8.14 (6H, s); mass spectrum (M+Na)/(POSI)=755; melting point: 300° C. or more.

Examples 1 to 3

(Production of Liquid Crystal Cell)

Compound (1), (2) or (8) of the present invention in an isotropic liquid state was injected into a cell with a horizontal orientation film having a glass-to-glass distance of 25 μm. After uniformly injecting the compound, the cell temperature was lowered until a discotic nematic phase state was brought about, and the liquid crystal was ripened at a temperature 10° C. lower than the Iso point temperature (a temperature of causing transition from discotic nematic phase to isotropic liquid) and thereby oriented in the horizontal alignment state. In this way, a liquid crystal cell was produced. The term "horizontal alignment" as used herein means that the long axis direction of the liquid crystal molecule (for example, the disc plane of the core in the case of a discotic liquid crystal molecule) is parallel to the horizontal plane of the liquid crystal layer (for example, the support surface in the case where the liquid crystal layer is formed on a support).

Comparative Examples 1 and 2

(Production of Liquid Crystal Cell)

Liquid crystal cells were produced by the same operation as in Examples 1 to 3 except for using Comparative Liquid Crystal Compound (1) or (2) shown below in place of the compounds employed in Examples 1 to 3.

Comparative Liquid Crystal Compound (1):

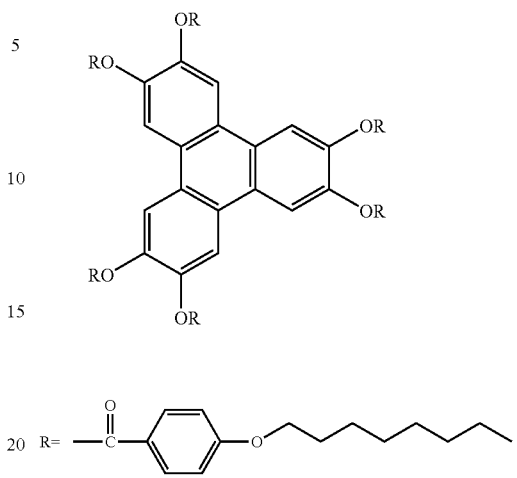

Comparative Liquid Crystal Compound (2):

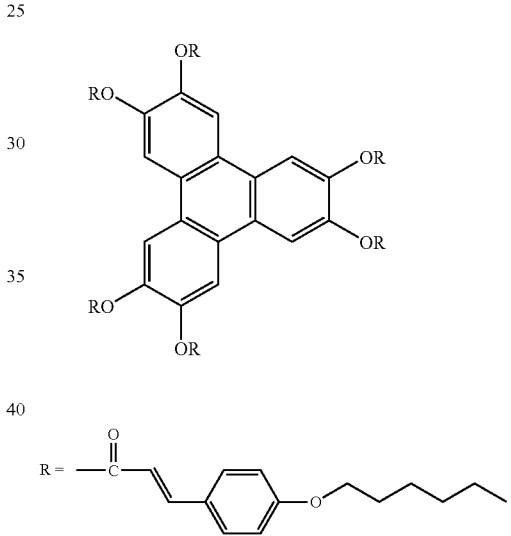

(Measurement of Wavelength Dispersion Value)

The liquid crystal cells obtained in Examples 1 to 3 and Comparative Examples 1 and 2 each was measured for the wavelength dependency of the retardation value in the direction inclined at 40° from the normal direction on the layer plane, by using KOBRA (manufactured by Oji Scientific Instruments). The wavelength dispersion value was expressed by a value obtained by dividing the retardation value at 478 nm by 747 nm. The results are shown in Table 1.

(Measurement of Δn)

The liquid crystal cells obtained in Examples 1 to 3 and Comparative Examples 1 and 2 each was measured for the retardation value at 545 nm by using KOBRA 21ADH (manufactured by Oji Scientific Instruments) while changing the angle of observation, and on supposition that this is a refractive index ellipsoid model, Δn was calculated by the method described in *Designing Concepts of the Discotic Negative Compensation Films SID98 DIGEST*. The results are shown in Table 1.

TABLE 1

|  | Liquid Crystal Compound | Wavelength Dispersion Value | Δn (545 nm) |
|---|---|---|---|
| Example 1 | Compound (1) | 1.13 | 0.112 |
| Example 2 | Compound (2) | 1.13 | 0.097 |
| Example 3 | Compound (8) | 1.14 | 0.108 |
| Comparative Example 1 | Comparative Liquid Crystal Compound (1) | 1.25 | 0.088 |
| Comparative Example 2 | Comparative Liquid Crystal Compound (2) | 1.31 | 0.105 |

As seen from the results in Table 1, when Comparative Liquid Crystal Compound (1) and Comparative Liquid Crystal Compound (2) are compared, in the case of Comparative Liquid Crystal Compound (2), Δn is large but the wavelength dispersion value is also large and it is recognized that in conventional compounds, Δn is in the trade-off relationship with the wavelength dispersion value. On the other hand, in Examples 1 to 3, a large Δn and a small wavelength dispersion value are attained and this verifies that the compounds of the present invention used in these Examples can get rid of the above-described trade-off relationship.

Example 4

(Production of Transparent Support)

The following components were charged into a mixing tank and stirred under heat to prepare a cellulose acetate solution (hereinafter sometimes referred to as a "dope").

| Composition of Cellulose Acetate Solution | |
|---|---|
| Cellulose acetate having an acetylation degree of 60.9% | 100 parts by mass |
| Triphenyl phosphate | 6.5 parts by mass |
| Biphenyl diphenyl phosphate | 5.2 parts by mass |
| Retardation Increasing Agent (1) shown below | 0.1 part by mass |
| Retardation Increasing Agent (2) shown below | 0.2 parts by mass |
| Methylene chloride | 310.25 parts by mass |
| Methanol | 54.75 parts by mass |
| 1-Butanol | 10.95 parts by mass |

Retardation Increasing Agent (1):

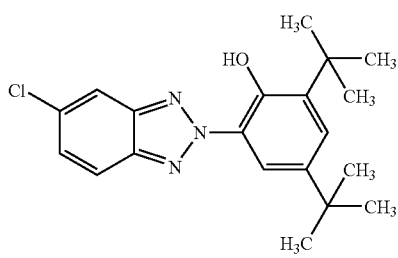

Retardation Increasing Agent (2):

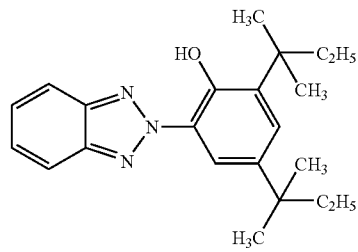

The dope prepared above was cast from a casting port on a drum cooled to 0° C. The film formed was peeled off in the state of having a solvent content of 70 mass % and after fixing both ends in the crosswise direction of the film by a pin tenter, the film was dried while keeping the distance of giving a stretching percentage of 3% in the crosswise direction (direction perpendicular to the machine direction) within the region where the solvent content was from 3 to 5 mass %. Thereafter, the film was further dried by transporting it between rollers of a heat-treating device and adjusted such that in the region of exceeding 120° C., the stretching percentage became substantially 0% and the ratio of the stretching percentage in the crosswise direction to the stretching percentage in the machine direction became 0.75 (by taking account of stretching of 4% in the machine direction at the peeling). In this way, a cellulose acetate film having a thickness of 100 μm was produced. The retardation value of the produced film was measured at a wavelength of 632.8 nm, as a result, the retardation value in the thickness direction was 40 nm and the in-plane retardation value was 4 nm. The produced cellulose acetate film was used as the transparent support.

(Formation of First Undercoat Layer)

On the transparent support prepared above, a coating solution having the following composition was coated in an amount of 28 ml/m² and dried to form a first undercoat layer.

| Composition of Coating Solution for First Undercoat Layer | |
|---|---|
| Gelatin | 5.44 parts by mass |
| Formaldehyde | 1.38 parts by mass |
| Salicylic acid | 1.62 parts by mass |
| Acetone | 391 parts by mass |
| Methanol | 158 parts by mass |
| Methylene chloride | 406 parts by mass |
| Water | 12 parts by mass |

(Formation of Second Undercoat Layer)

On the first undercoat layer, a coating solution having the following composition was coated in an amount of 7 ml/m² and dried to form a second undercoat layer.

| Composition of Coating Solution for Second Undercoat Layer | |
|---|---|
| Anionic polymer shown below | 0.77 parts by mass |
| Monoethyl citrate | 10.1 parts by mass |
| Acetone | 200 parts by mass |
| Methanol | 877 parts by mass |
| Water | 40.5 parts by mass |

Anionic Polymer:

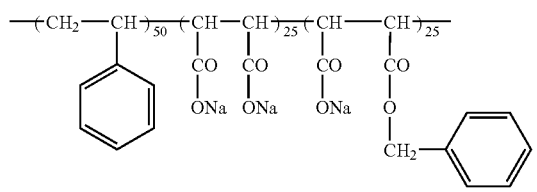

(Formation of Back Layer)

On the opposite surface of the transparent support, a coating solution having the following composition was coated in an amount of 25 ml/m² and dried to form a back layer.

| Composition of Coating Solution for Back Layer | |
|---|---|
| Cellulose diacetate having an acetylation degree of 55% | 6.56 parts by mass |
| Silica-base matting agent (average particle size: 1 μm) | 0.65 parts by mass |
| Acetone | 679 parts by mass |
| Methanol | 104 parts by mass |

(Formation of Orientation Film)

A modified polyvinyl alcohol shown below and glutaraldehyde (5 mass % of the modified polyvinyl alcohol) were dissolved in a methanol/water mixed solvent (volume ratio=20/80) to prepare a 5 mass % solution.

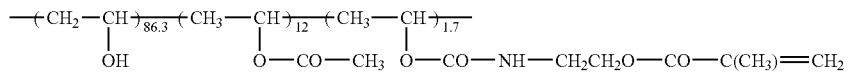

The solution prepared above was coated on the second undercoat layer, dried with hot air of 100° C. for 120 seconds and then rubbed to form an orientation film. The thickness of the obtained orientation film was 0.5 μm. The rubbing direction of the orientation film was parallel to the casting direction of the transparent support.

(Formation of Optically Anisotropic Layer)

On the rubbing-treated surface of the orientation film produced above, a coating solution for optically anisotropic layer having the following composition was coated by using a #4 wire bar.

| Coating Solution for Optically Anisotropic Layer | |
|---|---|
| Liquid Crystal Compound of the present invention (Compound (4)) | 100 parts by mass |
| Ethylene oxide-modified trimethylolpropane triacrylate (V#360, produced by Osaka Organic Chemical Industry Ltd.) | 9.9 parts by mass |
| Photopolymerization Initiator (Irgacure 907, produced by Nippon Ciba-Geigy) | 3.3 parts by mass |
| Sensitizer (Kayacure DETX, produced by Nippon Kayaku Co., Ltd.) | 1.1 parts by mass |
| Methyl ethyl ketone | 250 parts by mass |

The film having coated thereon the optically anisotropic layer was subjected to alignment in a thermostatic chamber and after fixing the aligned state of the optically anisotropic layer by irradiating an ultraviolet ray of 200 mJ/cm², the film was allowed to cool to room temperature to produce an optical compensatory sheet. The thickness of the optically anisotropic layer formed was 1.82 μm.

Example 5

(Formation of Optically Anisotropic Layer)

On the rubbing-treated surface of an orientation film produced in the same manner as in Example 4, an optically anisotropic layer was formed in the same manner as in Example 4 except for using Compound (3) in place of Compound (4) used in Example 4. The thickness of the obtained optically anisotropic layer was 1.80 μm.

Example 6

(Formation of Optically Anisotropic Layer)

On the rubbing-treated surface of an orientation film produced in the same manner as in Example 4, an optically anisotropic layer was formed in the same manner as in Example 4 except for using Compound (5) in place of Compound (4) used in Example 4. The thickness of the obtained optically anisotropic layer was 1.84 μm.

Comparative Example 3

On the orientation film produced in Example 4, a coating solution for optically anisotropic layer having the following composition was coated by using a #4 wire bar.

| Coating Solution for Optically Anisotropic Layer | |
|---|---|
| Comparative Discotic Liquid Crystalline Compound (Y) | 100 parts by mass |
| Ethylene oxide-modified trimethylolpropane triacrylate (V#360, produced by Osaka Organic Chemical Industry Ltd.) | 9.9 parts by mass |
| Photopolymerization Initiator (Irgacure 907, produced by Nippon Ciba-Geigy) | 3.3 parts by mass |
| Sensitizer (Kayacure DETX, produced by Nippon Kayaku Co., Ltd.) | 1.1 parts by mass |
| Cellulose acetate butyrate (CAB551-0.2, produced by Eastman Chemical) | 2.2 parts by mass |
| Cellulose acetate butyrate (CAB531-1, produced by Eastman Chemical) | 0.55 parts by mass |
| Methyl ethyl ketone | 250 parts by mass |

Comparative Discotic Liquid Crystalline Compound (Y):

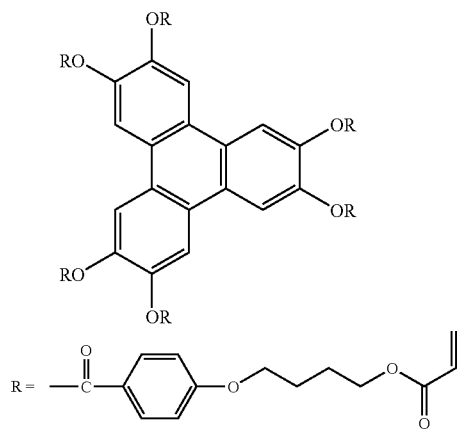

The film having coated thereon the optically anisotropic layer was subjected to alignment and after fixing the aligned state of the optically anisotropic layer by irradiating an ultraviolet ray of 200 mJ/cm², the film was allowed to cool to room temperature to produce an optical compensatory sheet. The thickness of the optically anisotropic layer formed was 1.90 µm.

Comparative Example 4

An optical compensatory sheet was produced by the same operation as in Comparative Example 3 except for using Comparative Discotic Liquid Crystalline Compound (Z) shown below in place of Comparative Discotic Liquid Crystalline Compound (Y) of Comparative Example 3. The thickness of the formed optically anisotropic layer was 1.88 µm.
Discotic Liquid Crystalline Compound (Z):

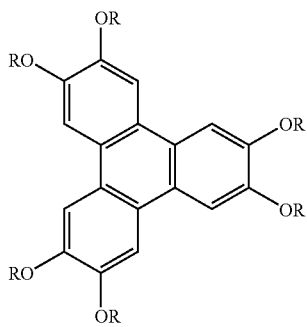

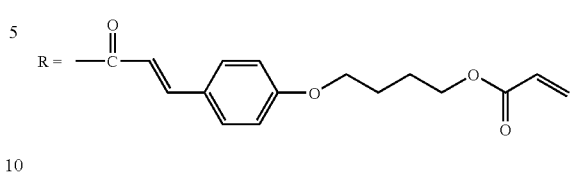

(Production of Liquid Crystal Display Device)

A polyimide orientation film was provided on a glass substrate having thereon an ITO electrode and subjected to a rubbing treatment. Two sheets of the obtained glass substrate were disposed through a 5-µm spacer such that the orientation film surfaces were opposed each other and the rubbing directions of the orientation films came to run at right angles. In the gap between two substrates, rod-like liquid crystal molecules (ZL4792, produced by Merck & Co., Inc.) were injected to form a rod-like liquid crystal layer. The Δn of the rod-like liquid crystal molecule was 0.0969. On both sides of the thus-produced TN liquid crystal cell, two sheets of the retardation plate produced above were disposed and attached such that the optically anisotropic layer came to face the liquid crystal cell substrate. Furthermore, two sheets of a polarizing plate were attached to the outer side of respective retardation plates, thereby producing a liquid crystal display device. Here, the retardation plates and polarizing plates were arranged such that the rubbing direction of the orientation film of the retardation plate came to run in non-parallel to the rubbing direction of the orientation film of the liquid crystal cell adjacent thereto and such that the absorption axis of the polarizing plate came to run in parallel to the rubbing direction of the liquid crystal cell.

A voltage was applied to the liquid crystal cell of the produced liquid crystal display device. By defining that the contrast ratio is the transmittance ratio between black display and white display when the white display was 2 V and the black display was 5 V, the region having a contrast ratio of 10 in up/down and right/left sides and free from occurrence of gradation reversal was measured as the viewing angle. Also, the angle dependency of the color tint in white display and black display was examined with an eye. The results obtained are shown in Table 2.

TABLE 2

| Retardation Plate | Δn | Film Thickness (µm) | Wavelength Dispersion | Viewing Angle | | Change of Color Tint |
|---|---|---|---|---|---|---|
| | | | | Up/Down | Right/Left | |
| Example 4 | 0.11 | 1.82 | 1.14 | 95° | 147° | not recognized |
| Example 5 | 0.12 | 1.80 | 1.15 | 95° | 147° | not recognized |
| Example 6 | 0.10 | 1.84 | 1.16 | 94° | 147° | not recognized |
| Comparative 3 | 0.07 | 1.90 | 1.24 | 92° | 145° | recognized |
| Comparative 4 | 0.09 | 1.88 | 1.29 | 92° | 145° | clearly recognized |

It is seen that when the compounds of the present invention used in Examples 4 to 6 are employed, the wavelength dispersion becomes small as compared with the conventionally known Discotic Liquid Crystalline Compound (Y) which is used in Comparative Example 3. Furthermore, despite the small wavelength dispersion, Δn value is larger than the conventionally known Discotic Liquid Crystalline Compound (Y) and therefore, the film can be formed to a thickness in the same range as in conventional techniques. In addition, as compared with Comparative Example 4 using Liquid Crystal Compound (Z) which is a triphenylene compound having a cinnamic acid derivative on the side chain described in JP-A-2001-166147, the wavelength dispersion is very small in Examples 4 to 6 and the effect of improving the color tint change is large.

Example 7

(Production of Optical Compensatory Film)

(Production of Support)

A cellulose acetate solution was prepared by charging the following composition into a mixing tank and stirring it under heat to dissolve respective components.

(Composition of Cellulose Acetate Solution)

| | |
|---|---|
| Cellulose acetate having an acetylation degree of 60.9% | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 300 parts by mass |
| Methanol (second solvent) | 45 parts by mass |
| Dye (360FP, produced by Sumika Fine Chemicals Co., Ltd.) | 0.0009 parts by mass |

Into a separate mixing tank, 16 parts by mass of the retardation increasing agent shown below, 80 parts by mass of methylene chloride and 20 parts by mass of methanol were charged and stirred under heat to prepare a retardation increasing agent solution.

Subsequently, 36 parts by mass of the retardation increasing agent solution and 1.1 parts by mass of silica fine particle (R972, produced by Aerosil) were mixed with 464 parts by mass of the cellulose acetate solution having the above-described composition and thoroughly stirred to prepare a dope. The amount of the retardation increasing agent added was 5.0 parts by mass per 100 parts by mass of cellulose acetate, and the amount of the silica fine particle added was 0.15 parts by mass per 100 parts by mass of cellulose acetate.

Retardation Increasing Agent:

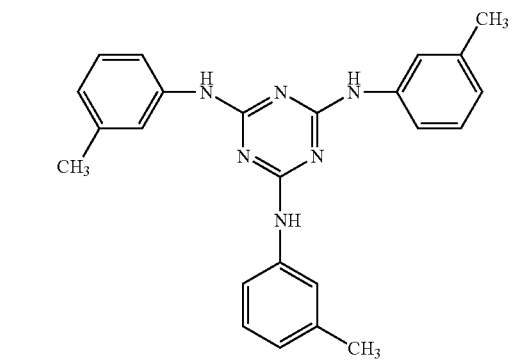

The obtained dope was cast by using a casting machine having a band with a width of 2 m and a length of 65 m. After the film surface temperature on the band reached 40° C., the film was dried for 1 minute and stripped off. The obtained film was dried with dry air at 140° C., stretched in the crosswise direction by 28%, and then dried with a dry air at 135° C. for 20 minutes to produce Support (PK-1) having a residual solvent amount of 0.3 mass %.

The width of the obtained Support (PK-1) was 1,340 mm and the thickness was 92 μm. The retardation value (Re) at a wavelength of 590 nm was measured by using KOBRA 21ADH (manufactured by Oji Scientific Instruments) and found to be 38 nm. Also, the retardation value (Rth) at a wavelength of 590 nm was measured and found to be 175 nm.

Thereafter, 10 cc/m$^2$ of a 1.0N potassium hydroxide solution (solvent:water/isopropyl alcohol/propylene glycol=69.2 parts by mass/15 parts by mass/15.8 parts by mass) was coated on the band face side of Support (PK-1) and in this state, the support was kept at about 40° C. for 30 seconds. Subsequently, the alkali solution was scraped off and then the support was washed with pure water and after removing the water droplet by an air knife, dried at 100° C. for 15 seconds. The contact angle to water of this PK-1 was determined and found to be 42°.

(Production of Orientation Film)

On this PK-1 (alkali-treated surface), a coating solution for orientation film having the following composition was coated to a coverage of 28 ml/m$^2$ by a #16 wire bar coater and then dried with warm air at 60° C. for 60 seconds and further with warm air at 90° C. for 150 seconds to produce an orientation film.

(Composition of Coating Solution for Orientation Film)

| | |
|---|---|
| Modified polyvinyl alcohol shown above | 10 parts by mass |
| Water | 371 parts by mass |
| Methanol | 119 parts by mass |
| Glutaraldehyde (crosslinking agent) | 0.5 parts by mass |
| Citric acid ester (AS3, produced by Sankyo Chemical Co., Ltd.) | 0.35 parts by mass |

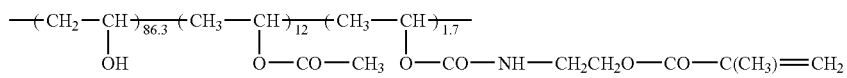

(Rubbing Treatment)

A rubbing roll (diameter: 300 mm) was set to apply a rubbing treatment of 45° with respect to the longitudinal direction and by rotating the roll at 650 rpm, the PK-1 surface having provided thereon the orientation film was rubbed while transporting PK-1 at a rate of 20 m/min. The contact length between the rubbing roll and PK-1 was set to 18 mm.

(Formation of Optically Anisotropic Layer)

A coating solution prepared by dissolving 41.01 kg of Compound(4), 4.06 kg of ethylene oxide-modified tri-methylolpropane triacrylate (V#360, produced by Osaka Organic Chemical Industry Ltd.), 0.35 kg of cellulose acetate butyrate (CAB531-1, produced by Eastman Chemical), 1.35 kg of photopolymerization initiator (Irgacure 907, produced by Ciba-Geigy) and 0.45 kg of sensitizer (Kayacure DETX, produced by Nippon Kayaku Co., Ltd.) in 102 kg of methyl ethyl ketone, and adding thereto 0.1 kg of fluoroaliphatic group-containing copolymer (Megafac F780, produced by Dai-Nippon Ink & Chemicals, Inc.) was continuously coated on the orientation film surface of PK-1 by rotating a #3.0 wire bar at 470 rotations in the same direction as the film transportation direction while transporting the PK-1 at 20 m/min.

The solvent was dried in the process of continuously heating from room temperature to 100° C. and then, the film was heated for about 90 seconds in a dry zone at 130° C. to align the discotic liquid crystal compound. Subsequently, the film was transported to a dry zone at 80° C. and in the state that the film surface temperature was 90° C., ultraviolet light with an illuminance of 600 mW was irradiated for 4 seconds by an ultraviolet irradiation apparatus (ultraviolet lamp, output: 160 W/cm, emission length: 1.6 m) to allow a crosslinking reaction to proceed, thereby fixing the alignment of the discotic liquid crystal compound. Thereafter, the film was allowed to coal to room temperature and cylindrically taken up into a roll form. In this way, rolled Optical Compensatory Film (KH-1) was produced.

A part of this rolled Optical Compensatory Film (KH-1) was cut out for use as a sample and measured for the optical properties. The retardation value Re of the optically anisotropic layer measured at a wavelength of 546 nm was 30 nm. The angle (tilt angle) between the disk plane of the discotic liquid crystal compound in the optically anisotropic layer and the support plane was continuously changed in the depth direction of the layer and was 29° on average. Also, after separating only the optically anisotropic layer from the sample, the average direction of the molecular axis of symmetry in the optically anisotropic layer was measured and found to be 45° with respect to the longitudinal direction of Optical Compensatory Film (KH-1).

Furthermore, the polarizing plates were disposed in cross-Nicol arrangement and unevenness of the resulting optical compensatory film was observed. As a result, even when the film was viewed from the front or from the direction tilted at 60° with respect to the normal line, unevenness was not detected.

Comparative Example 5

A rubbing roll (diameter: 300 mm) was set to give a rubbing direction of 45° with respect to the longitudinal direction and by rotating the roll at 650 rpm, the PK-1 surface having provided thereon the orientation film was rubbed while transporting PK-1 at a rate of 20 m/min.

Thereafter, Optical Compensatory Film (KH-H1) was produced in the same manner as in Example 7 except for using Comparative Discotic Liquid Crystalline Compound (Z) as the discotic liquid crystal compound.

A part of the rolled optical compensatory film obtained was cut out for use as a sample and measured for the optical properties. The retardation value Re of the optically anisotropic layer measured at a wavelength of 546 nm was 31 nm. The angle (tilt angle) between the disk plane of the discotic liquid crystal compound in the optically anisotropic layer and the transparent support plane was 29° on average.

Also, after separating the optically anisotropic layer from PK-1, the average direction of the molecular axis of symmetry in the optically anisotropic layer was measured and found to be 45.2° with respect to the longitudinal direction of Optical Compensatory Film (KH-H1).

Example 8

(Production of Polarizing Plate)

A PVA film (thickness: 80 μm, width: 2,500 mm) having an average polymerization degree of 1,700 and a saponification degree of 99.5 mol % was uniaxially stretched to 8 times in warm water at 40° C. and in this state, dipped in an aqueous solution containing 0.2 g/liter of iodine and 60 g/liter of potassium iodide at 30° C. for 5 minutes and then dipped in an aqueous solution containing 100 g/liter of boric acid and 30 g/liter of potassium iodide. At this time, the width of the film was 1,300 mm and the thickness was 17 μm.

Furthermore, this film was dipped in a washing bath at 20° C. for 10 seconds, then dipped in an aqueous solution containing 0.1 g/liter of iodine and 20 g/liter of potassium iodide at 30° C. for 15 seconds and thereafter dried at room temperature for 24 hours to obtain iodine-based Polarizer (HF-1).

On one side of Polarizer (HF-1), the support (PK-1) surface of Optical Compensatory Film (KH-1) was attached by using a polyvinyl alcohol-based adhesive. Also, a 80 μm-thick triacetyl cellulose film (TD-80U, produced by Fuji Photo Film Co., Ltd.) was saponified and attached to the opposite side of the polarizer by using a polyvinyl alcohol-based adhesive.

At this time, the longitudinal direction of the polarizer, the longitudinal direction of Support (PK-1) and the longitudinal direction of a commercially available triacetyl cellulose film were arranged all to run in parallel. In this way, Polarizing Plate (HB-1BR) was produced.

Separately, on one side of Polarizer (HF-1), the Support (PK-1) surface of Optical Compensatory film (KH-1) produced in Example 7 was attached by using a polyvinyl alcohol-based adhesive. Also, a film with antireflection function (Fuji Film CV-UA, produced by Fuji Photo Film Co., Ltd.) was saponified and attached to the opposite side of the polarizer by using a polyvinyl alcohol-based adhesive.

At this time, the longitudinal direction of the polarizer, the longitudinal direction of Support (PK-1) and the longitudinal direction of a commercially available triacetyl cellulose film were arranged all to run in parallel. In this way, Polarizing Plate (HB-1BF) was produced.

Comparative Example 6

(Production of Polarizing Plate)

Polarizing Plates (HB-H1R, HB-H1F) were produced in the same manner as in Example 8 except for using KH-H1 (optical compensatory film) produced in Comparative Example 5.

Example 9

(Production of Bend Aligned Liquid Crystal Cell)

On a glass substrate with an ITO electrode, a polyimide film was provided as an orientation film, and the orientation film was subjected to a rubbing treatment. Two sheets of the obtained glass substrates were disposed to face each other while arranging respective rubbing directions in parallel. The cell gap was set to 4.5 µm. In the cell gap, a liquid crystal compound (ZLI1132, produced by Merck & Co., Inc.) having Δn of 0.1396 was injected to produce a bend aligned liquid crystal cell. The size of the liquid crystal cell was 20 inches.

The bend aligned cell obtained was interposed between Polarizing Plate (HB-1BF) produced in Example 8 and Polarizing Plate (HB-1BR) by attaching these polarizing plates on the viewing side and the backlight side, respectively. These were arranged such that the optically anisotropic layer of the elliptically polarizing plate came to face the cell substrate, and the rubbing direction of the liquid crystal cell was not parallel to the rubbing direction of the optically anisotropic layer facing the liquid crystal cell.

A rectangular wave voltage of 55 Hz was applied to the liquid crystal cell. The mode was set to a normally white mode with white display of 2 V and black display of 5 V. By defining that the contrast ratio is the transmittance ratio (white display/black display), the viewing angle was measured in 8 stages from black display (L1) to white display (L8) by using a measuring meter (EZ-Contrast 160D, manufactured by ELDIM), and the angle dependency of the color tine was examined with an eye. Also, the front contrast (CR: brightness of white display/brightness of black display) was determined. The results are shown in Table 3.

Comparative Example 7

A panel was produced and evaluated in the same manner as in Example 9 except for using HB-H1F as the polarizing plate on the viewing side and HB-H1R as the polarizing plate on the backlight side. The results are shown in Table 3.

TABLE 3

| Polarizing Plate Used for Bend Aligned Liquid Crystal Cell | Viewing Angle* | | | Front CR | Color Tint Change |
|---|---|---|---|---|---|
| | Up | Down | Right/ Left | | |
| Example 9 | 80 | 80 | 80 | 500 | not recognized |
| Comparative Example 7 | 80 | 78 | 80 | 495 | clearly recognized |

*The range having a contrast ratio of 10 or more and no occurrence of gradation reversal (reversal between L1 and L2) on the black side.

INDUSTRIAL AVAILABILITY

The present invention can provide an optically anisotropic material excellent in both the wavelength dispersion property and the refractive index anisotropy. The present invention can also provide a liquid crystal display device reduced in the color tint change of a displayed image and improved in the viewing angle property. Thus, industrial applicability of the present invention is high.

The present disclosure relates to the subject matter contained in Japanese Patent Application No. 79389/2004 filed on Mar. 19, 2004 and Japanese Patent Application No. 274718/2004 filed on Sep. 22, 2004, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. An optically anisotropic material comprising at least one discotic compound having a cyclopropylcarbonyl group, wherein said discotic compound haying a cyclopropylcarbonyl group is a compound represented by the following formula (I):

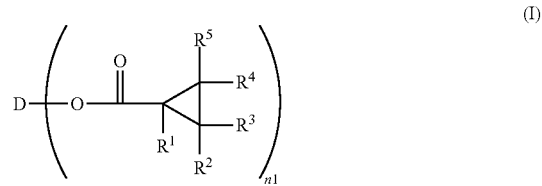

wherein D represents a discotic core, n1 represents an integer of 3 to 20, and $R^1$, $R^2$, $R^3$, $R^4$ and $R^5$ each represents a hydrogen atom or a substituent and may combine with each other to form a ring.

2. The optically anisotropic material of claim 1, wherein said compound represented by formula (I) is a compound represented by the following formula (II):

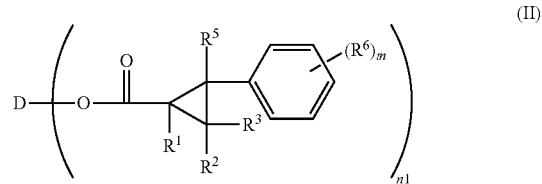

wherein D represents a discotic core, n1 represents an integer of 3 to 20, $R^1$, $R^2$, $R^3$ and $R^5$ each represents a hydrogen atom or a substituent and may combine with each other to form a ring, m represents an integer of 1 to 5, $R^6$ represents a substituent, and when multiple $R^6$s are present, these may be the same or different or may combine with each other to form a ring.

3. The optically anisotropic material of claim 2, wherein $R^6$ is a halogen atom, a substituted or unsubstituted alkyl group, a substituted or unsubstituted alkoxy group, a substituted or unsubstituted alkoxycarbonyl group, a substituted or unsubstituted aryl group, a substituted or unsubstituted aryloxy group, a substituted or unsubstituted acyloxy group, a substituted or unsubstituted alkoxycarbonyloxy group, or a substituted or unsubstituted aryloxycarbonyloxy group.

4. The optically anisotropic material of claim 1, wherein $R^1$, $R^2$, $R^3$ and $R^5$ each is a hydrogen atom, a substituted or unsubstituted alkyl group, a cyano group, an alkoxycarbonyl group or a halogen atom.

5. The optically anisotropic material of claim 1, wherein said discotic compound having a cyclopropylcarbonyl group is a discotic liquid crystal.

6. The optically anisotropic material of claim 5, wherein said discotic compound having a cyclopropylcarbonyl group is a discotic compound having a polymerizable group, represented by the following formula (III), said polymerizable group is polymerized in the state of the disc plane of said discotic compound being aligned, and this alignment is fixed by the polymerization:

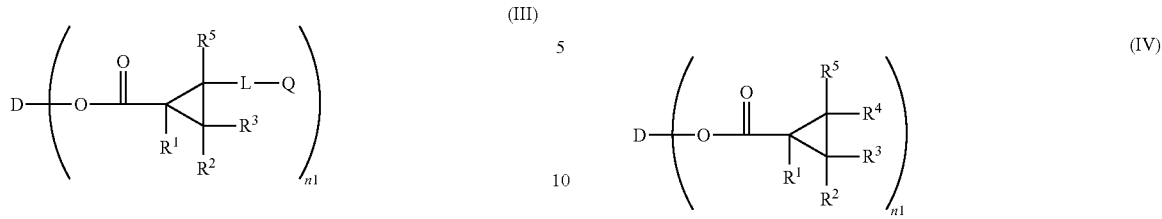

wherein D represents a discotic core, n1 represents an integer of 3 to 20, $R^1$, $R^2$, $R^3$ and $R^5$ each represents a hydrogen atom or a substituent and may combine with each other to form a ring, L represents a divalent linking group selected from an oxygen atom, a sulfur atom, a carbonyl group, a substituted or unsubstituted alkylene group, a substituted or unsubstituted arylene group and a combination thereof, and Q represents a polymerizable group.

7. The optically anisotropic material of claim 6, wherein Q is an epoxy group or an ethylenically unsaturated group.

8. The optically anisotropic material of claim 1, wherein said discotic core is triphenylene.

9. The optically anisotropic material of claim 1, wherein the alignment of said discotic compound having a cyclopropylcarbonyl group is forming a discotic nematic phase.

10. An optically anisotropic film formed from the optically anisotropic material of claim 1.

11. An optical compensatory sheet comprising a transparent support and an optically anisotropic layer formed from the optically anisotropic material of claim 1.

12. A liquid crystal display device comprising the optically anisotropic material of claim 1.

13. The liquid crystal display device of claim 10, which comprises an optically anisotropic layer formed from the optically anisotropic material.

14. A triphenylene compound represented by the following formula (IV):

wherein D represents a triphenylene group, n1 represents an integer of 3 to 6, and $R^1$, $R^2$, $R^3$, $R^4$ and $R^5$ each represents a hydrogen atom, a substituted or unsubstituted alkyl group having from 1 to 20 carbon atoms, a substituted or unsubstituted alkenyl group having from 3 to 20 carbon atoms, a substituted or unsubstituted alkoxy group having from 1 to 20 carbon atoms, a substituted or unsubstituted alkenyloxy group having from 3 to 20 carbon atoms, a substituted or unsubstituted aryl group having from 6 to 20 carbon atoms, a substituted or unsubstituted aryloxy group having from 6 to 20 carbon atoms, or a substituted or unsubstituted alkoxycarbonyl group having from 1 to 20 carbon atoms.

15. The triphenylene compound of claim 14, wherein when $R^4$ represents a substituted or unsubstituted alkyl group having from 3 to 20 carbon atoms, a substituted or unsubstituted alkoxy group having from 3 to 20 carbon atoms, a substituted or unsubstituted aryl group having from 6 to 20 carbon atoms or a substituted or unsubstituted aryloxy group having from 6 to 20 carbon atoms and at the same time, $R^4$ has a substituent, a polymerizable group is present at the terminal of said substituent.

16. The triphenylene compound of claim 14, wherein when $R^4$ represents a substituted or unsubstituted aryl group having from 6 to 20 carbon atoms and at the same time, $R^4$ has a substituent, a polymerizable group is present at the terminal of said substituent.

17. The triphenylene compound of claim 15, wherein said polymerizable group is an epoxy group or an ethylenically unsaturated group.

* * * * *